United States Patent [19]
Ikedo et al.

[11] Patent Number: 5,084,854
[45] Date of Patent: Jan. 28, 1992

[54] OPTICAL DISK REPRODUCING APPARATUS

[75] Inventors: Yuji Ikedo; Hisashi Hamachi; Toshiaki Koizumi; Gen Inoshita; Takaaki Matsumoto, all of Saitama, Japan

[73] Assignee: Pioneer Electronic Corporation, Tokyo, Japan

[21] Appl. No.: 466,560

[22] Filed: Jan. 17, 1990

[30] Foreign Application Priority Data

| Jan. 19, 1989 | [JP] | Japan | 1-3856 |
| Jan. 19, 1989 | [JP] | Japan | 1-8651 |
| Jan. 19, 1989 | [JP] | Japan | 1-8653 |
| Jan. 19, 1989 | [JP] | Japan | 1-8656 |
| Jan. 19, 1989 | [JP] | Japan | 1-8657 |
| Jan. 19, 1989 | [JP] | Japan | 1-8659 |
| Jan. 19, 1989 | [JP] | Japan | 1-8660 |

[51] Int. Cl.$^5$ .............. G11B 33/00; G11B 33/02
[52] U.S. Cl. .................. 369/75.1; 369/77.1; 369/77.2
[58] Field of Search .............. 369/75.2, 77.1, 77.2; 360/99.02, 99.03, 99.06, 99.07

[56] References Cited

U.S. PATENT DOCUMENTS

| 4,764,917 | 8/1988 | Sugihara | 369/77.1 |
| 4,773,057 | 9/1988 | Otsuka | 369/75.2 |
| 4,807,216 | 2/1989 | Kawamura | 369/77.2 |
| 4,862,445 | 8/1989 | Sasaki | 369/75.2 |
| 4,949,328 | 8/1990 | Kase | 369/75.2 |

*Primary Examiner*—Stuart S. Levy
*Assistant Examiner*—John C. Pokotylo
*Attorney, Agent, or Firm*—Sughrue, Mion, Zinn, Macpeak & Seas

[57] ABSTRACT

An optical disk player having improved disk loading and optical pickup adjusting mechanisms. In accordance with one aspect of the invention, an optical disk loading device is disclosed in which rollers are inserted into a guide groove on a side face of a tray holding the optical disk thereon. The roller has a spherically expansive portion formed in the inserting portion into which the roller is inserted into the guide groove. In accordance with another aspect of the invention, there is disclosed a disk loading device for an optical disk reproducing apparatus in which the elevating member for raising and lowering the tray is disposed on only one side of the tray and the tray can be stably moved horizontally and vertically, while at least the lower half of the tray is left open and is available for the mounting of other components such as electronic circuits.

12 Claims, 26 Drawing Sheets

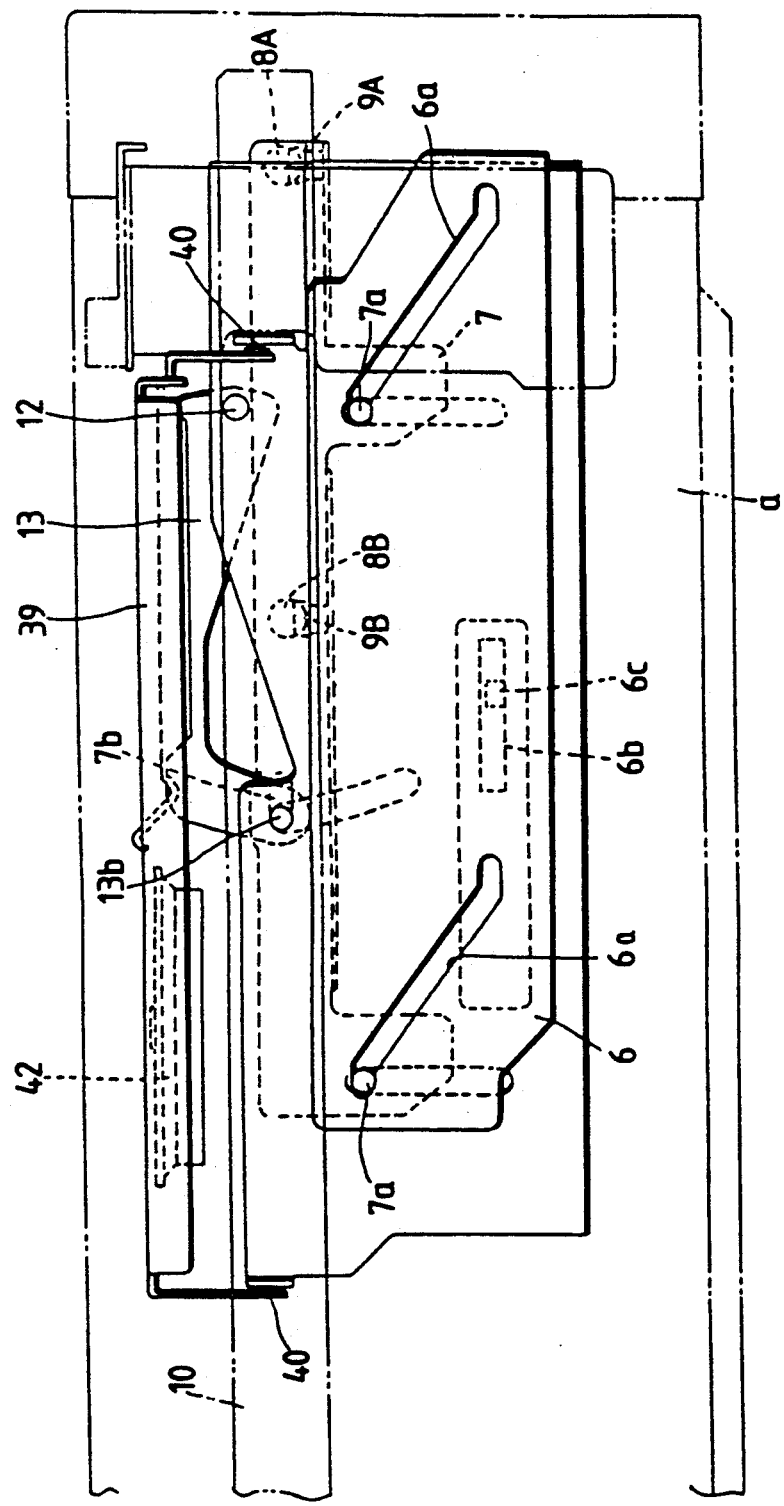

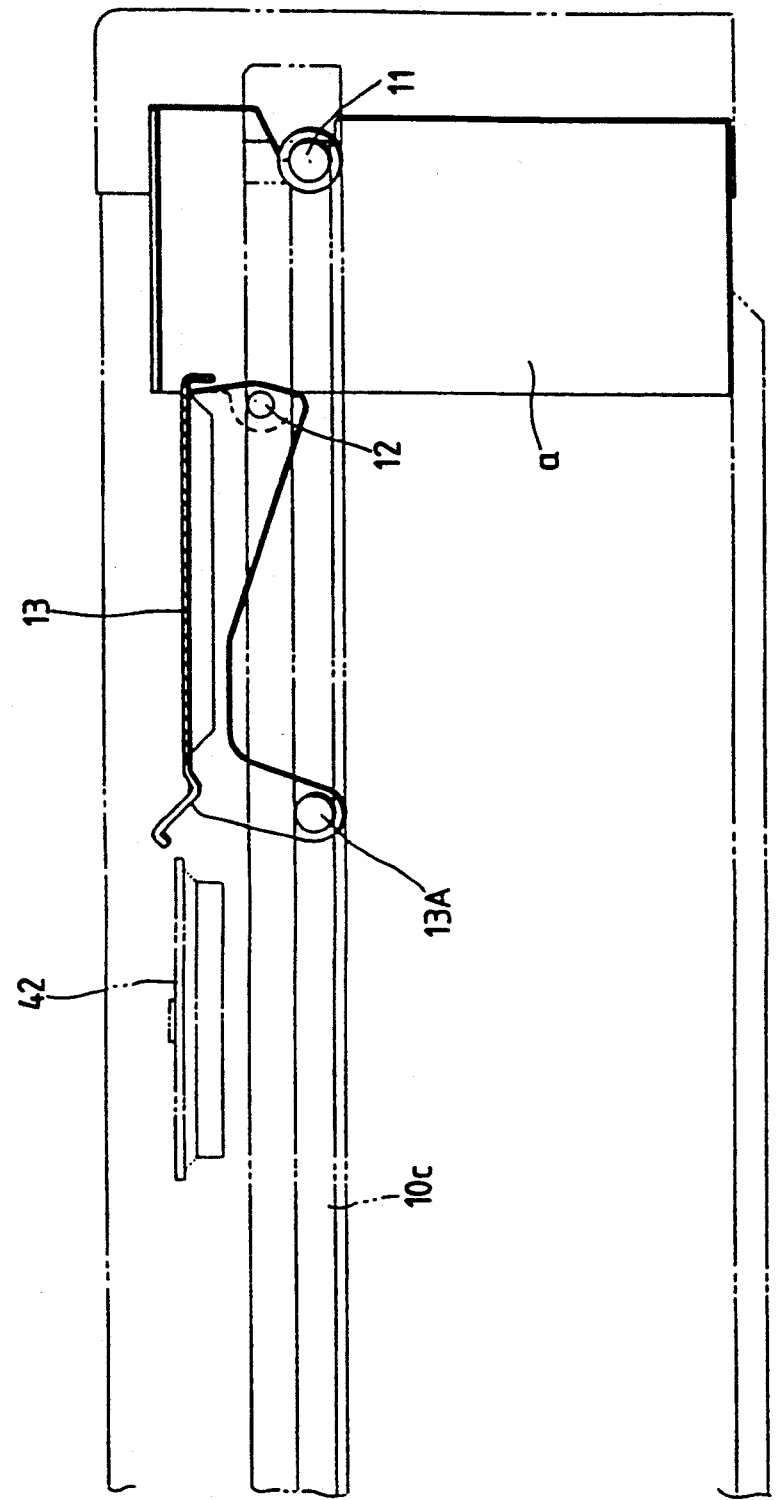

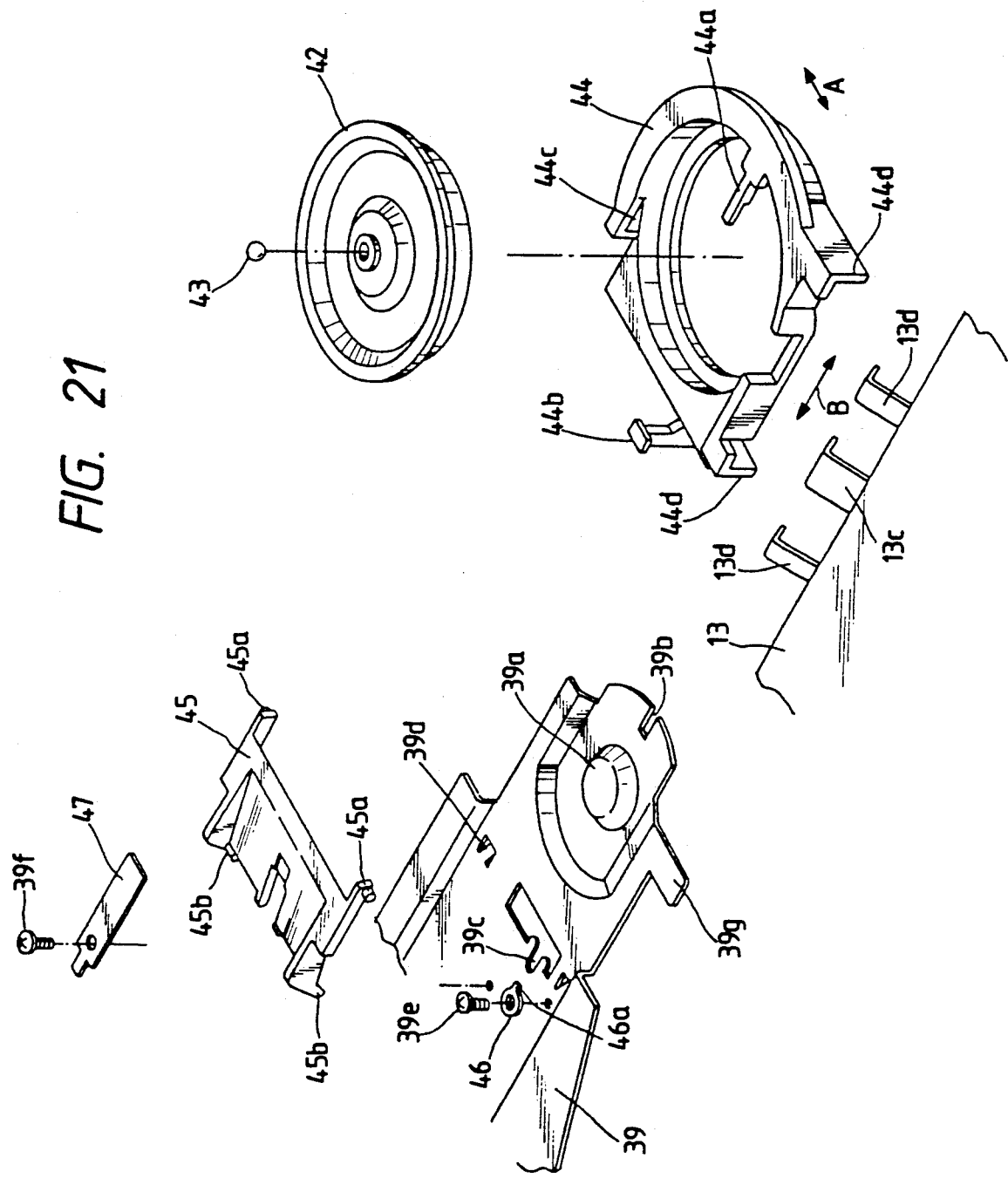

OPTICAL DISK REPRODUCING APPARATUS

BACKGROUND OF THE INVENTION

The present invention relates to an optical disk loading device in an optical disk reproducing apparatus for reproducing a signal on an optical disk such as an optical video disk, a digital audio disk, etc., in which a tray for mounting the optical disk thereon is horizontally moved and is then pulled into the reproducing apparatus and is thereafter vertically moved to move the optical disk onto a turntable.

In a conventional loading device of this kind, a cylindrical roller is inserted into a guide groove on a side face of the tray. Accordingly, if the tray is twisted or bent by an external force, parallelism between the circumferential face of the roller and the contact face of the guide groove is lost so that a portion of the roller moves or eats into the guide groove. Therefore, it becomes difficult to horizontally move the tray smoothly. Moreover, when the roller and the guide groove are deformed by such movement of the roller portion into the guide groove, a rattle is caused by the deformed portion during every loading operation, and the loading operation can no longer be performed smoothly.

In particular, such a problem often occurs when an elevating plate is disposed on only one side of the tray and a member for supporting the roller is raised and lowered on the other side of the tray in accordance with the raising and lowering movements of the elevating plate, or when the number of rollers is reduced.

Also, in the conventional loading device horizontal guide grooves are disposed on opposite sides of the tray on which the disk is mounted for reproduction. The tray is moved in the horizontal direction by guide members of elevating members disposed on the right and left sides of the tray to pull the tray into the reproducing apparatus. The elevating members on both sides of the tray are lowered in association with each other so that the tray is lowered while the horizontal state of the tray is maintained, thereby to lower the disk onto the turntable.

In this apparatus, it is necessary to dispose the elevating members on both sides of the tray and to provide a mechanism for operating the elevating members on the lower side of the tray. As a result, the space under the tray is entirely occupied and is not available for the mounting of electronic circuits or the like. This makes the overall size of the apparatus larger than desired.

The present invention further relates to an optical axis adjusting device for an optical-type pickup for aligning a straight line passing through the center of a turntable to a straight line passing through the optical axis of the pickup.

In a conventional pickup optical axis adjusting device, the spindle motor for the turntable is mounted such that the center of the turntable is positioned on an extension of a moving straight line defined by the optical axis of the pickup. In another device, the optical pickup is moved in a direction perpendicular to a guide shaft and is fixed to a support member such that the optical axis of the pickup is located on the center line of the turntable.

However, if in the conventional pickup optical axis adjusting device the spindle motor and the pickup are not premounted in a unitary assembly, these members can be freely moved relative to one another, and it is difficult for the assembly worker to align these members.

Further, since this adjustment must be performed after the assembly of the optical disk reproducing apparatus, it is difficult to fasten and unfasten the attaching screws of the spindle motor and the optical pickup.

The present invention still further relates to an optical axis adjusting device for an optical disk reproducing apparatus for reproducing information recorded on an optical disk such as an optical video disk, a digital audio disk, etc., which performs a tangential adjustment in which the optical axis of the optical pickup is made perpendicular to the surface of an optical disk in a plane perpendicular to a straight line passing through the center of a turntable.

A conventional optical pickup adjusting device for performing the tangential adjustment is shown in FIGS. 31 and 32. As shown in these figures, guide shaft 60 attached to a base plate guides optical pickup 62 fixed to attaching body 61 towards the outer circumference of the optical disk from the center thereof. Two fitting portions 61a and 61b of attaching body 61 are fitted to this guide shaft 60 and are guided thereby so that attaching body 61 is not inclined with respect to guide shaft 60. Screw 65 and pressure spring 66 are disposed on the opposite side of fitting portions 61a and 61b of the attaching body 61 and between attaching body 61 and slide piece 64 guided by guide piece 63 of the base plate.

Accordingly, when screw 65 is pressed against pressure spring 66, attaching body 61 is rotated around guide shaft 60 in the direction shown by an arrow in FIG. 32. Therefore, optical axis c of optical pickup 62 can be tilted leftward and rightward with respect to the face of the optical disk, thereby performing the tangential adjustment of the pickup.

In such a conventional pickup optical axis adjusting device, however, since the tangential adjustment is performed by setting the optical disk, screw 65 cannot be rotated from above so that the tangential adjustment must be performed from a lower or side face of the device.

Accordingly, when screw 65 is rotated from the side face of the device, it is very difficult for the operator to rotate this screw since the rotary center of the screw is perpendicular to the vertical direction.

To be able to carry out tangential adjustment from the lower face of the device, it is necessary to provide holes in several parts of the base plate, etc., and hence the mechanical strength these parts is reduced and the location for performing the adjustment thereof is limited.

The present invention yet further relates to a disk loading device of an optical disk reproducing apparatus for reproducing an optical disk such as an optical video disk or a digital audio disk in which the optical disk is mounted on a tray and the tray is pulled into the optical disk reproducing apparatus by a horizontal movement and then lowered and moved onto the turntable, and a clamper is lowered from above to clamp the optical disk between the turntable and the clamper.

A conventional disk loading device of this kind is operated by a cam mechanism for lowering the tray and a cam mechanism for raising and lowering a clamper support member attaching the clamper thereto. However, in the conventional loading device the tray is lowered and the clamping operation by the clamper is performed by separate cam mechanisms. Therefore, it is necessary to provide a mechanism for conforming the operating timings of the two cam mechanisms to each other. Further, it is necessary to provide a mechanism for holding the tray and the clamper in their positions after the tray has been moved and the clamping operation has been completed by the clamper.

When such a mechanism operates the tray and the clamper by movement through a small stroke, their operations sometimes cannot be smoothly performed due to differences in the dimensions thereof and their operating positions become unstable, thereby reducing the efficiency in operation.

If the stroke is increased to solve this problem, the size of the cam member is increased, making it is necessary to provide a large space installation space therefor, which makes it difficult to make the reproducing apparatus compact.

Furthermore, if the radial movement is efficiently converted to a linear movement, the structure is limited to a mechanism having a rack, pinion, etc.

The present invention also relates to a disk clamping device of an optical disk reproducing apparatus for clamping, on a turntable for rotating an optical disk such as an optical video disk, an optical audio disk, etc., the optical disk between the turntable and a clamper.

In a conventional disk clamping device, the clamper is rotatably attached through a ball member to an end of a clamper attaching plate pivotally supported at one end thereof. When the optical disk is clamped, the clamper is oriented parallel to the turntable. However, the clamper is supported approximately parallel to the clamper attaching plate except for the clamping time of the disk. That is, the clamper attaching plate is pivotally supported at one end thereof such that the clamper is parallel to the turntable when the optical disk is clamped. Accordingly, when no clamping operation is performed and the clamper is raised, the clamper attaching plate is inclined with respect to the turntable such that the end of the clamper attaching plate is inclined upward.

Thus, since the clamper is supported parallel to the clamper attaching plate, the clamper is also inclined at this time with respect to the turntable. When the optical disk is set on the turntable, it is necessary to have a certain amount of space between the turntable and the clamper. However, as mentioned above, since the clamper is inclined, the size between the turntable and the lowermost end of the inclined clamper is set to the size of the above space. Accordingly, the clamper must be unnecessarily raised by the amount of its inclination. Therefore, the rotary angle of the clamper attaching plate must be large and the distance through which it must be raised must be large, and thus, the height of the optical disk reproducing apparatus is correspondingly increased.

The invention still further relates to an optical disk player having a tilting device for maintaining a parallel relation between a moving straight line defined by the optical axis of the optical pickup thereof and the axis of movement of a clamper used to clamp the optical disk to the turntable and for maintaining the optical axis of the pickup perpendicular to the clamped disk. When a deviation from the perpendicular orientation is detected, the tilting device is driven so as to tilt the optical axis of the optical pickup in such a manner that the optical axis of the pickup is made to return to be perpendicular with respect to the surface of the disk.

In the conventional apparatus, the clamper and the tilting device were operated by separate and independent drive units. That is, separate motors were provided to separated drive a disk loading mechanism for pulling the optical disk into the player and placing and clamping it on the turntable and for maintaining the optical axis of the pickup vertical at all times with respect to the surface of the disk. Moreover, it was necessary to provide a separate mechanism for holding the clamper in position. As a result, the overall mechanism was complicated and often less reliable than desired. Also, the space required for the two separate motors was large.

SUMMARY OF THE INVENTION

To solve the above-mentioned problems, an object of the present invention is to provide an optical disk loading device for smoothly moving the tray even when the tray is twisted or bent and preventing a trace from being left in the roller and the guide groove of the tray.

To attain the above object, the present invention resides in an optical disk loading device in which a roller is inserted into a guide groove on a side face of a tray mounting the optical disk thereon and is attached to an elevating plate and is raised and lowered together with the guide groove and has a spherically expansive portion formed in the inserting portion into which the roller is inserted into the guide groove.

To further solve the above-described problems, another object of the invention is to provide a disk loading device for an optical disk reproducing apparatus in which the elevating member for raising and lowering the tray is disposed on only one side of the tray and the tray can be stably moved horizontally and vertically, although at least the lower half of the tray is left open and is available for the mounting of other components such as electronic circuits.

To achieve the above object, the invention provides a disk loading apparatus for an optical disk reproducing apparatus in which a guide groove on one side of the tray on which the optical disk is mounted for reproduction is horizontally guided by a guide member of an elevating member, and a guide groove on the other side of the tray is horizontally guided by a guide groove of an arm plate associated with the elevating member and another guide member, and the tray is lowered by the lowering movement of the elevating member using the elevating member and the guide member of the arm plate, and another guide member is pulled out of an opening of the guide groove.

To overcome other of the above-mentioned problems, another object of the present invention is to provide a pickup optical axis adjusting device in an optical disk reproducing apparatus for enabling fine adjustment of the optical axis of the pickup and permitting easy adjustment thereof, even after the assembly of the optical disk reproducing apparatus and without requiring unfastening the attaching screws of the spindle motor and the optical pickup.

To attain the above object, the present invention provides a pickup optical axis adjusting apparatus for an optical disk reproducing apparatus in which an attaching member is movable in the axial direction of a chassis for supporting a turntable and is biased in one direction thereof, and adjusting means disposed in the attaching member can push a contact piece fixed to the chassis against the biasing force and can move the attaching member in the axial direction.

To solve other of the above-mentioned problems, a further object of the present invention is to provide a pickup optical axis adjusting device of an optical disk reproducing apparatus for easily performing the tangential adjustment from above and outside the outer circumference of a set disk.

To attain this object, the present invention provides an optical pickup optical axis adjusting device for an optical disk reproducing apparatus comprising an attaching body for attaching the optical pickup thereto and guided by a guide shaft of a support plate at two points thereof, an auxiliary attaching plate pivotally supported by the attaching body and slidably mounted on the support plate at one point thereof, and adjusting means disposed on one side of the pivotal point between the attaching body and the auxiliary attaching plate and adjusting the size therebetween.

To solve further of the above-mentioned problems, an object of the present invention is to provide a disk loading device of an optical disk reproducing apparatus for efficiently engaging and disengaging one slide member for lowering the tray and the clamper by the rotation of one rotary member and sliding the slide member at the disengaging time thereof, thereby simplifying the mechanism and obtaining a desired operating timing.

To attain the above object, the present invention provides a disk loading device of an optical disk reproducing apparatus in which an engaging member is moved by a cam groove of a rotary member and an arm portion of a slide member is disengaged from the engaging member and thereafter its projection is fitted into an engaging groove of the slide member to slide the slide member so that the tray is lowered and the optical disk is clamped by the clamper. Thereafter, the engaging member is moved by the cam groove in the opposite direction to engage it with the arm portion of the slide member.

To solve still further of the above-mentioned problems, another object of the present invention is to provide a disk clamping device of an optical disk reproducing apparatus in which the clamper is supported parallel to the turntable when the optical disk is clamped between the turntable and the clamper and further when the clamper is raised so that the raising distance of the clamper is minimized and the amount of wasted space in an upper portion of the clamper is reduced so as to reduce the height of the optical disk reproducing apparatus and simplify its mechanism.

To attain the above object, the present invention provides a disk clamping device of an optical disk reproducing apparatus in which a clamper attaching plate is pivotally supported at one end thereof and is vertically rotated and a clamper housing body is pivotally supported in parallel to the pivotal support portion of the clamper attaching plate at the end thereof and an arm plate is pivotally supported in a direction perpendicular to this clamper attaching plate and the clamper housing body is pushed upwards in parallel to the pivotal support portion of the arm plate by a push-up projection at an end thereof, thereby housing the clamper in the clamper housing body.

To overcome yet other of the above-discussed problems, it is an object of the present invention to provide an optical disk reproducing apparatus in which a tilting adjustment for clamping the optical disk on the turntable and an operation of maintaining the optical axis of the optical pickup perpendicular to the surface of the optical disk are performed with a single mechanism and motor, thereby simplifying the mechanism and improving its reliability while reducing the cost of the mechanism.

To attain this object, the invention provides an optical disk reproducing apparatus in which an elevating cam member raises and lowers the clamper for clamping the optical disk and a tilt cam is formed on an engaging member engaged with the elevating cam member in the fully elevated position of the clamper, and an attaching member on which the optical pickup is mounted and which linearly moves the optical pickup and a contact piece of the attaching member contacts the tilt cam with a biasing force to thereby perform a tilting adjustment by the driving of the engaging member.

To further achieve this object, the present invention provides an optical pickup device for an optical disk reproducing apparatus comprising a support plate for mounting the optical pickup thereon in such a manner that the optical pickup can be moved linearly, a pivotal support portion disposed so as to be perpendicular to the moving direction of the optical pickup and axially movable towards a pivotal support portion of the chassis of the apparatus, adjusting means for axially moving and fixing the support plate, and axially movable cam means for inclining the support plate with respect to an axis thereof.

BRIEF DESCRIPTION OF THE DRAWINGS

FIGS. 6(a), 6(b), 7(a) and 7(b) are side views showing the operation of an elevating plate in the apparatus;

FIG. 21 is an exploded perspective view of the clamper section;

DESCRIPTION OF THE PREFERRED EMBODIMENTS

Figure 1:
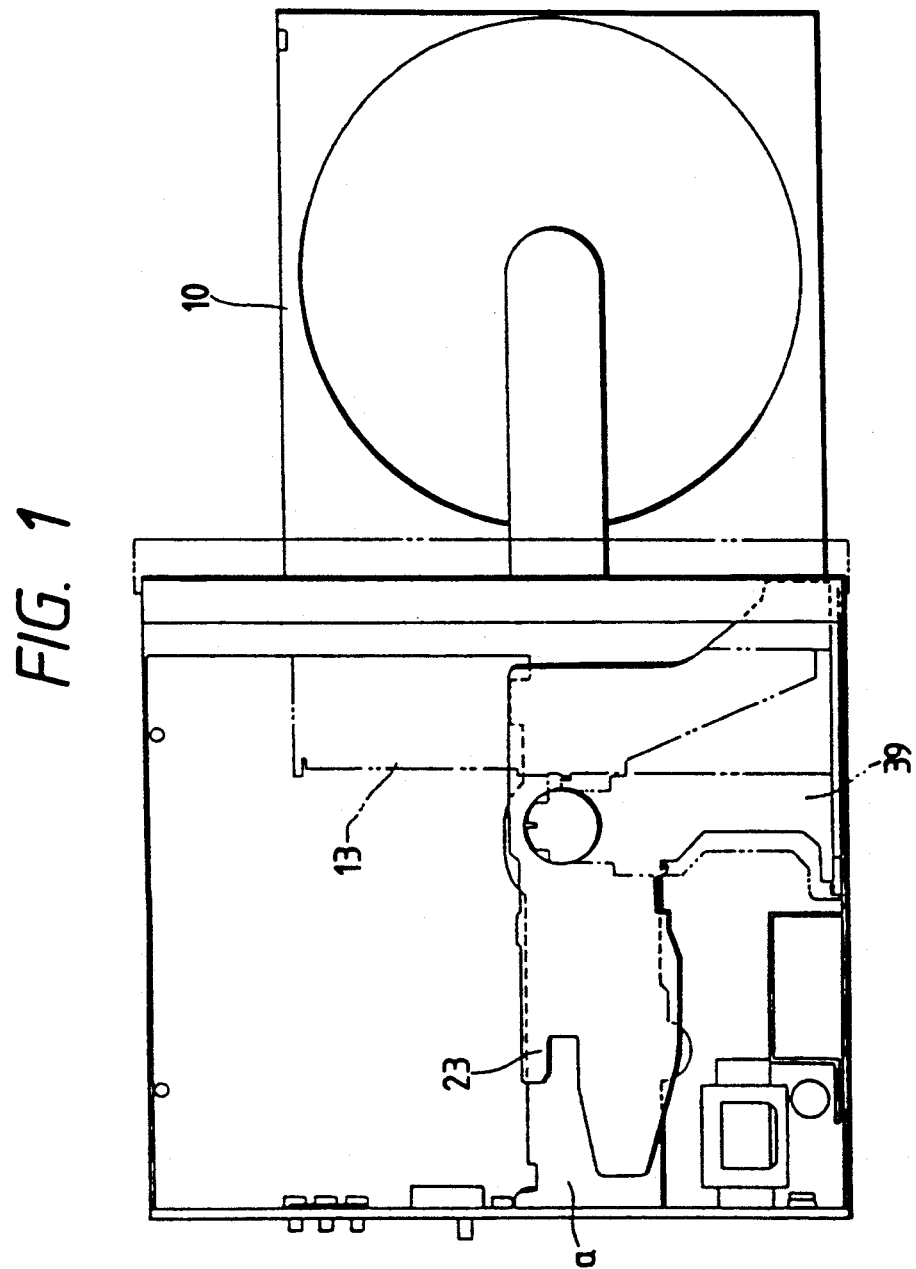
FIG. 1 is a plan view of an optical disk reproducing apparatus to which the present invention is applied.

A preferred embodiment of an optical disk loading device of the present invention will next be described with respect to an optical disk reproducing apparatus which can reproduce any one of optical disks having diameters 30 cm, 20 cm, 12 cm and 8 cm.

In FIG. 5, a motor 1 is attached to a chassis a and a cam gear 3 is engaged with a gear 2 rotated by the motor 1 through a speed reduction mechanism. A longitudinal gear 5 having longitudinal teeth is driven by an associated gear engaged with a toothless gear 4 integral with the cam gear 3.

In FIG. 6(a), a slide plate 6 is movably supported by chassis a only in the left-hand and right-hand directions. Pins 7a of an elevating plate 7 movably supported by chassis a only in the vertical direction is inserted into cam holes 6a of slide plate 6.

Accordingly, when slide plate 6 is slid in the right-hand and left-hand directions, pins 7a is guided by cam holes 6a and elevating plate 7 is raised and lowered.

Figure 3:
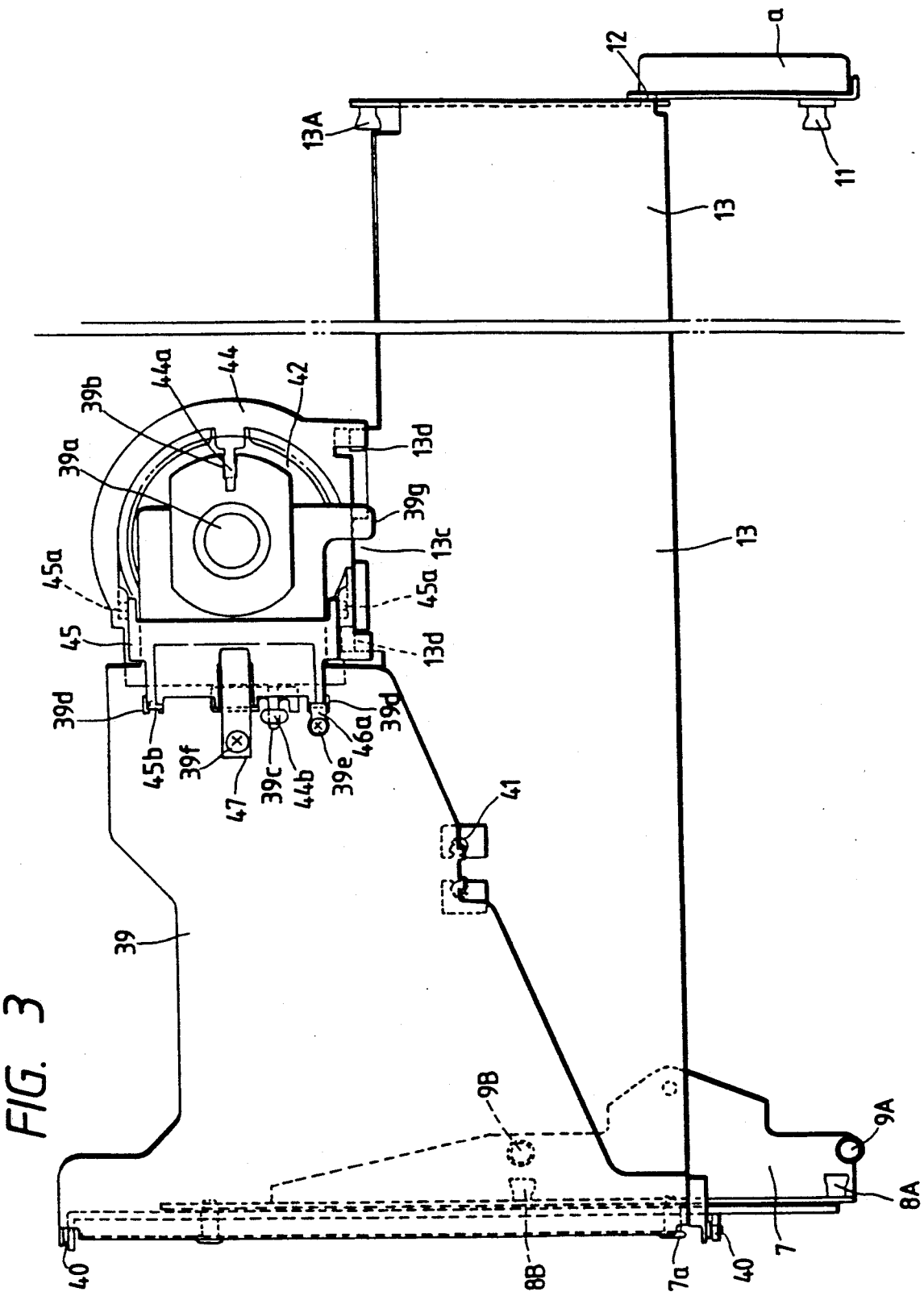
FIG. 3 is a plan view of a clamper section in the apparatus of FIG. 1.

As shown in FIG. 3, two rollers 8A, 8B pivotally supported in the horizontal direction are attached to this
elevating plate 7, and two rollers 9A, 9B pivotally supported in the vertical direction are further attached to elevating plate 7 in the same positions as those of the rollers 8A, 8B in the forward and backward directions.

Figure 8:
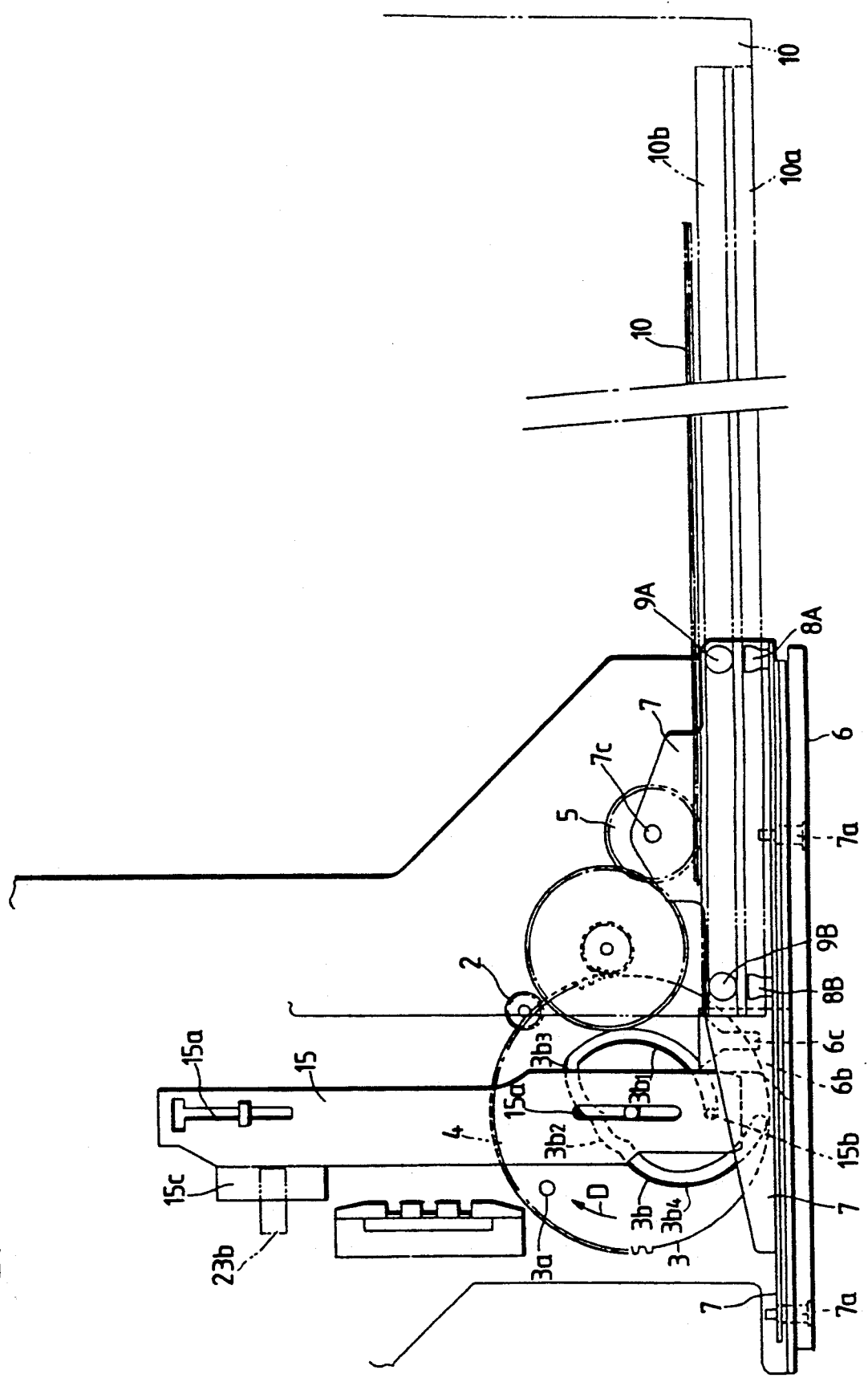
FIGS. 8 to 10 are plan views showing the operation of the loading drive section and a tray.
Figure 10:
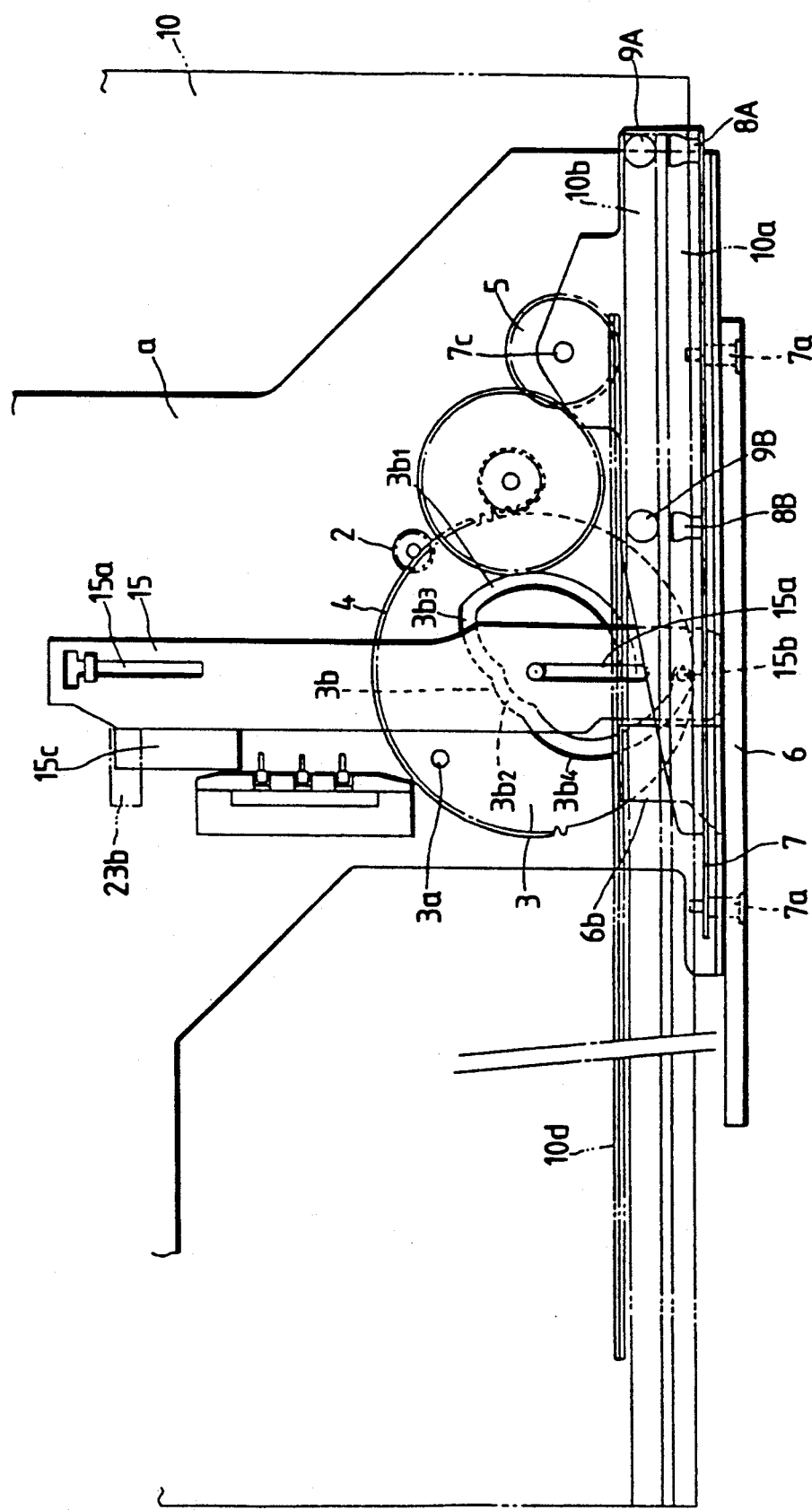

As shown in FIGS. 8 and 10, a guide groove 10a is formed on one side face of a tray 10 on which an optical disk b is mounted and is fitted to rollers 8A, 8B. Guide groove 10b on the bottom face of tray 10 is fitted to rollers 9A, 9B.

Figure 4:
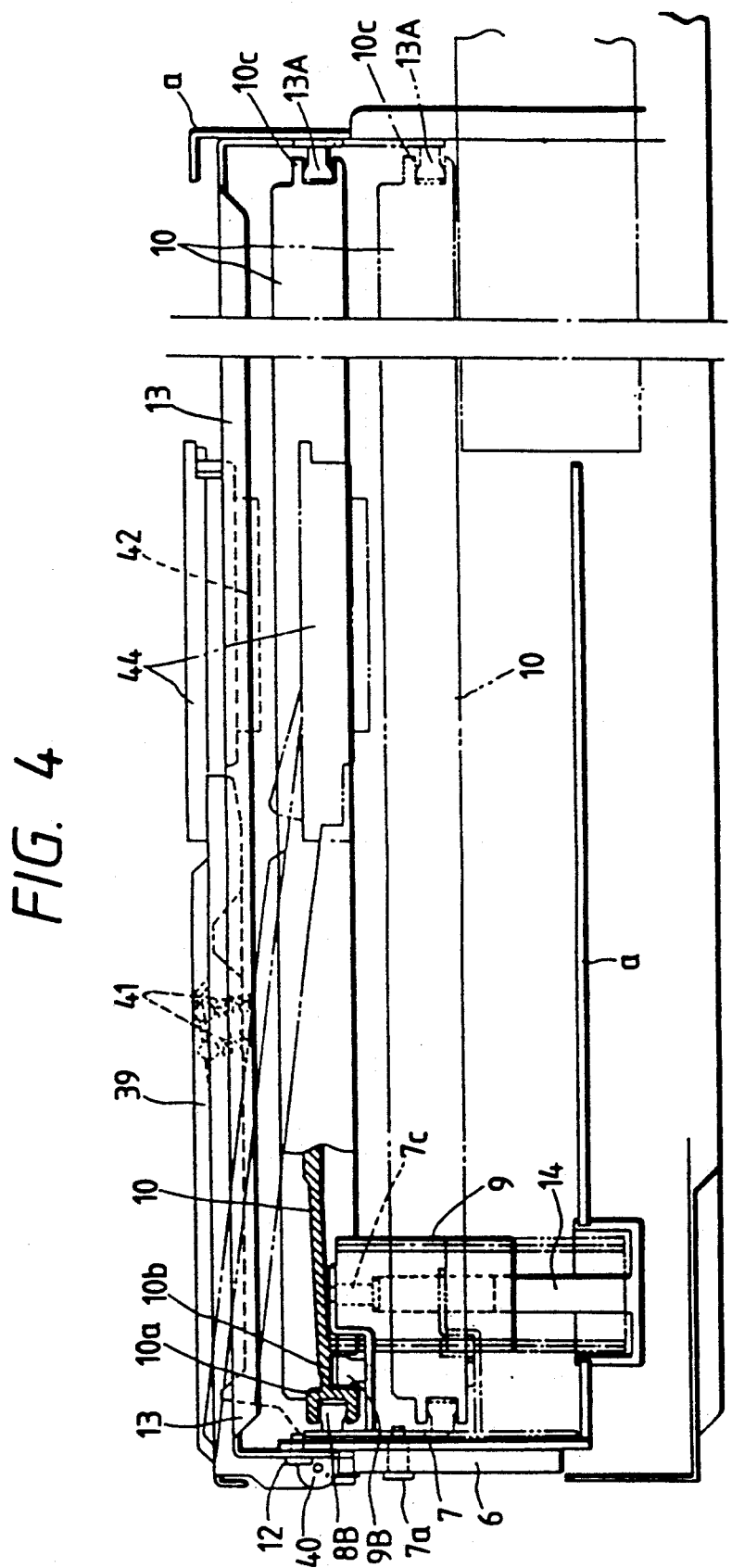
FIG. 4 is a front view of the overall apparatus.

Accordingly, tray 10 can move in the forward and backward directions in FIG. 4 with respect to elevating plate 7 by guiding guide grooves 10a, 10b by rollers 8A, 8B, 9A, and 9B.

Figure 7A:
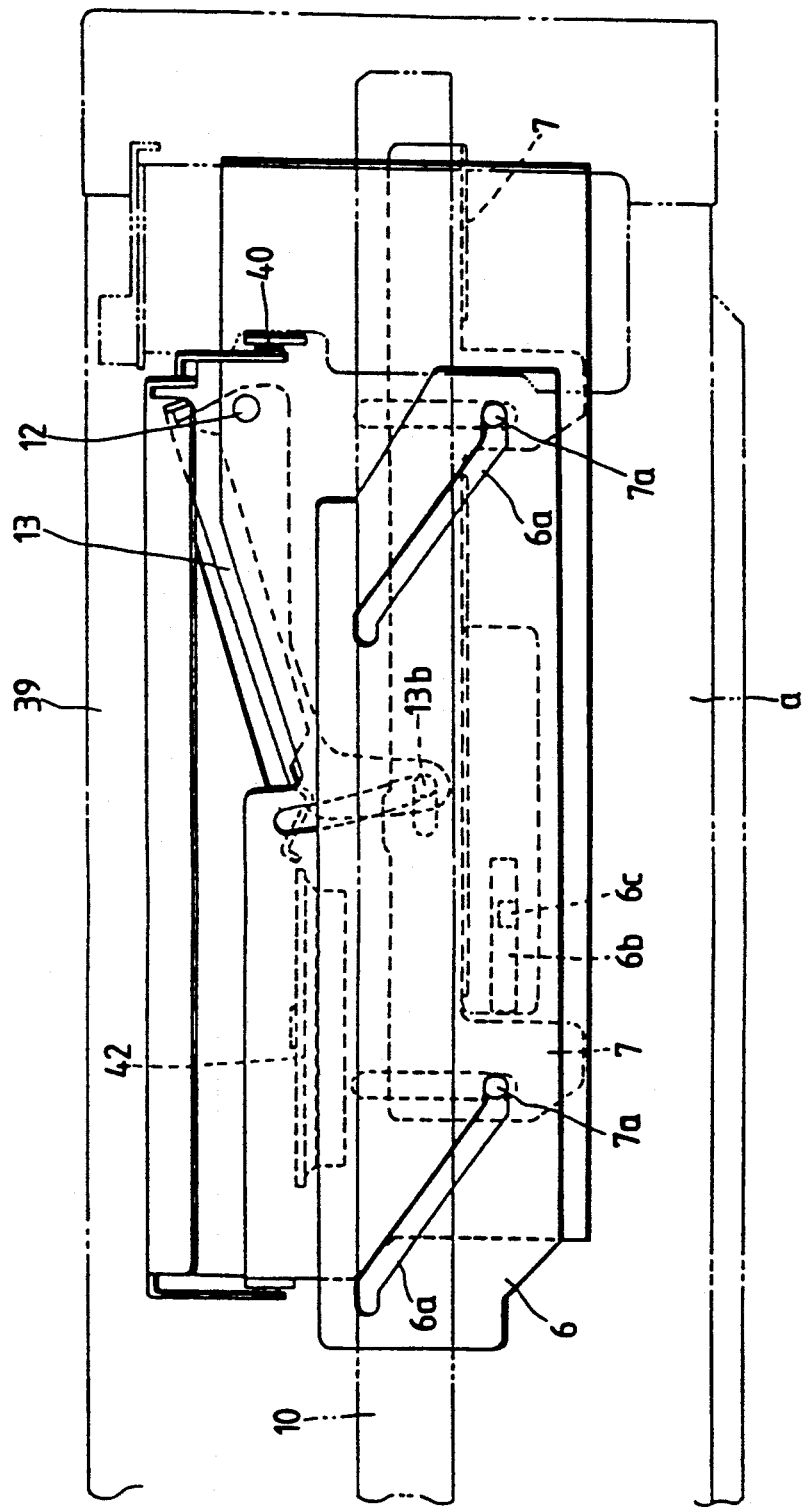
Figure 7B:
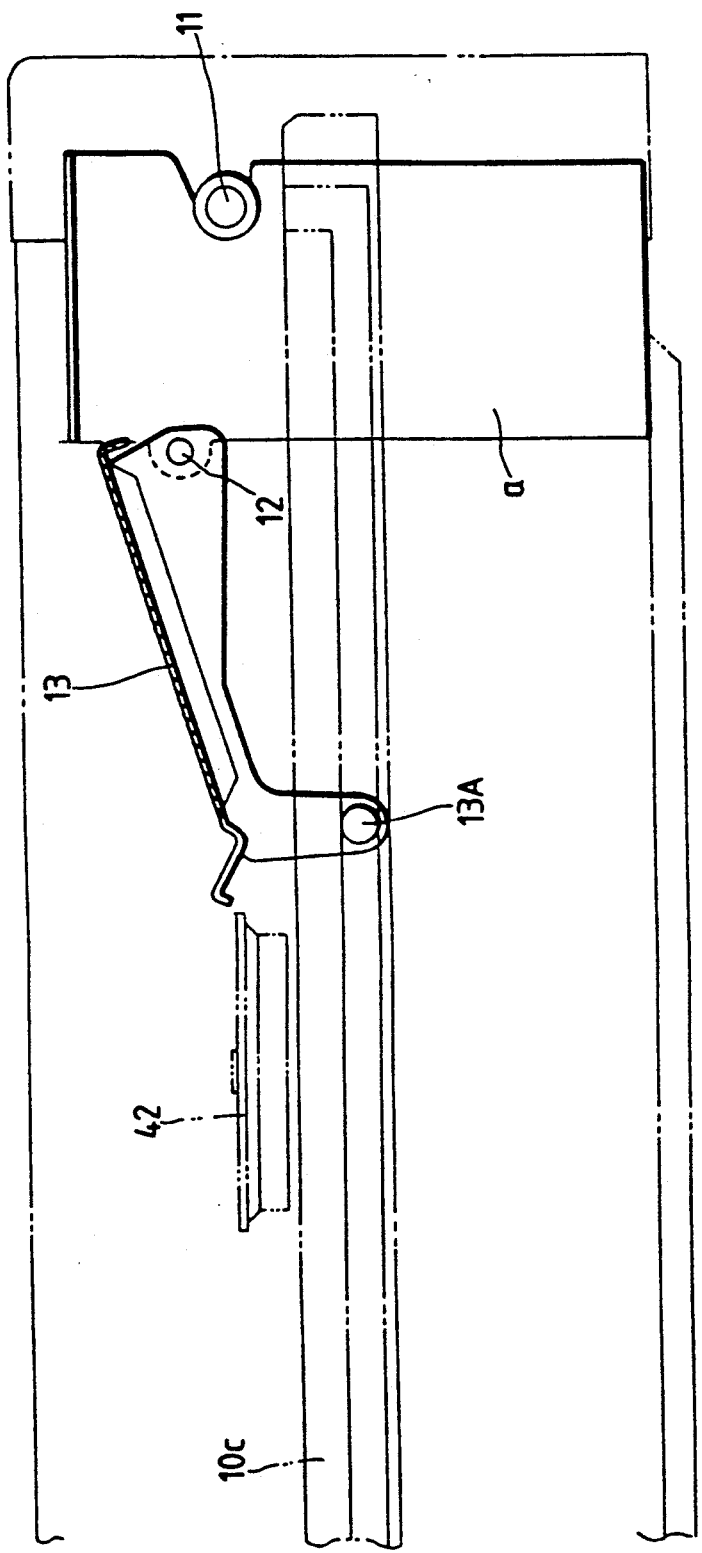

As shown in FIGS. 6(b) and 7(b), guide groove 10c is disposed on the other side of this tray 10 and is open upwards at one end thereof. Roller 11 is pivotally supported by chassis a in the horizontal direction by arm plate 13 pivotally supported by shaft 12 of chassis a. Rollers 11 and 13A are inserted into guide groove 10c.

Accordingly, when an end of arm plate 13 is in a lowered position and rollers 11, 13A are in the same horizontal position, tray 10 can move in the horizontal direction in FIG. 4 as mentioned above.

When tray 10 is moved to a terminal position thereof a roller 11 is in alignment with the upper opening at one end of guide groove 10c and arm plate 13 is rotated around shaft 12, roller 11 is pulled out of the upper opening of guide groove 10c, and tray 10 can be thereby lowered.

Pin 13b is vertically disposed in arm plate 13 and is inserted into connecting hole 7b of elevating plate 7 as shown in FIGS. 6(a) and 7(a). Arm plate 13 is rotated in accordance with the raising and lowering movements of elevating plate 7.

Figure 5A:
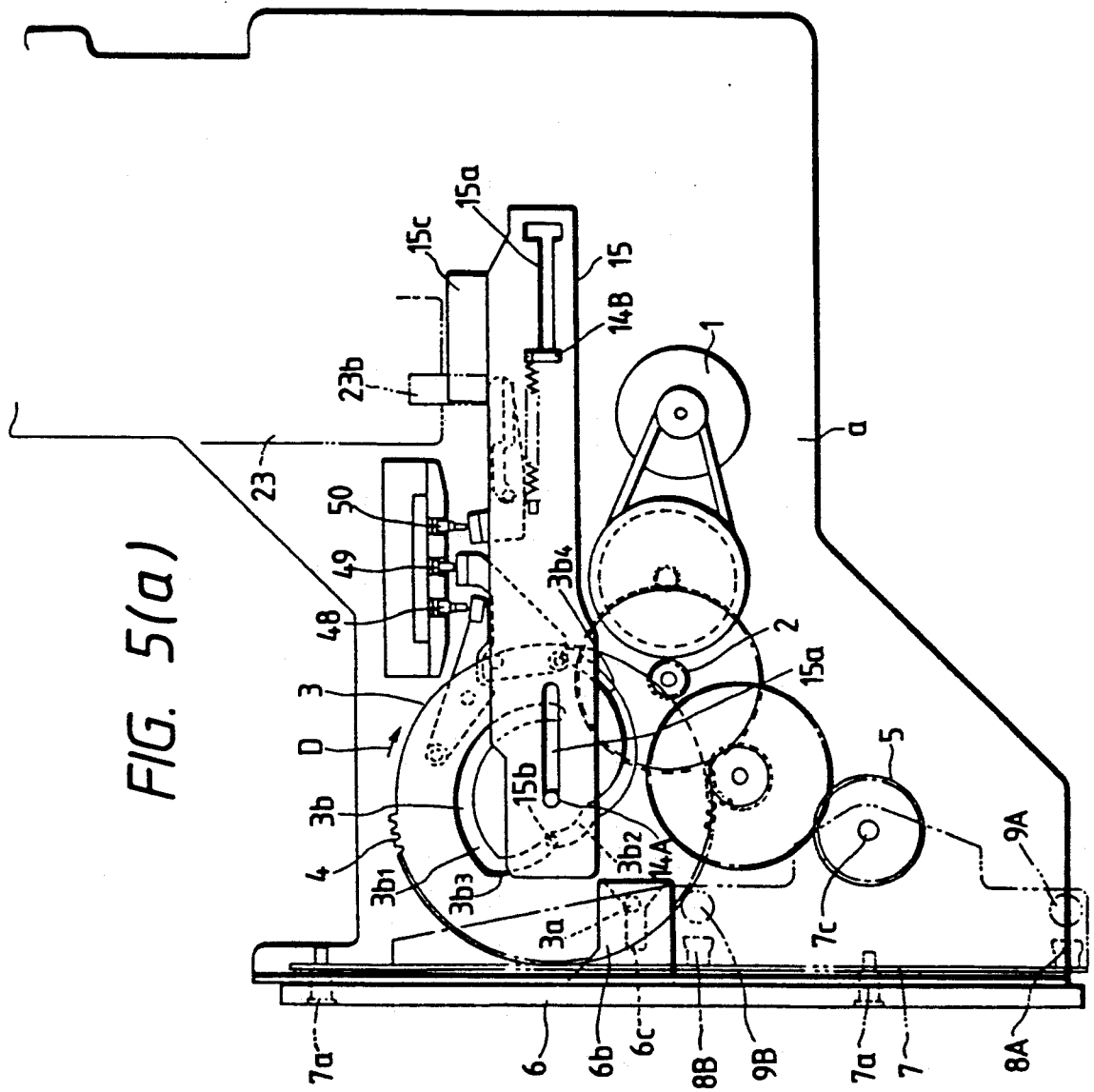
FIG. 5(a) is a plan view of a loading drive section in the apparatus.

As shown in FIG. 5(a), the above longitudinal gear 5 is rotatably attached to shaft 7c disposed in elevating plate 7. Longitudinal gear 5 is raised and lowered while gear 5 is supported by shaft 14 of chassis a and shaft 7c.

Accordingly, longitudinal gear 5 is not disengaged from a gear for driving the same even when elevating plate 7 is raised and lowered, and longitudinal gear 5 is engaged with a rack 10d (shown in FIG. 9) of tray 10 raised and lowered together with elevating plate 7 at all times.

Further, as shown in FIG. 5(a), groove 6c having a Y shape is disposed in arm position 6b of slide plate 6. Pin 3a projecting onto an upper face of cam gear 3 enters groove 6c from an end divergent portion of Y-shaped groove 6c and presses groove 6c to move slide plate 6. Thereafter, pin 3a is moved out of the end divergent portion of Y-shaped groove 6c.

Cam groove 3b is disposed on an upper face of cam gear 3 and is composed of two arc portions $3b_1$, $3b_2$ having a center at the center of cam gear 3, cam portion $3b_3$ connecting arc portions $3b_1$, $3b_2$ to each other, and cam portion $3b_4$ extending on the outer circumferential side of the cam gear from arc portion $3b_2$.

Pin 14A of chassis a is slidably received in guide groove 15a of linearly movable engaging plate 15, and pin 15b projecting on the lower face of engaging plate 15 is inserted into the above cam groove 3b.

Accordingly, when pin 15b is located in arc portion $3b_1$ of cam groove 3b, engaging plate 15 is not moved even when cam gear 3 is rotated. When pin 15b reaches cam portion $3b_3$, engaging plate 15 is moved rightward as shown in FIG. 5(a) in accordance with the rotation of cam gear 3.

When pin 15b next reaches arc portion $3b_2$, engaging plate 15 is not moved even when cam gear 3 is rotated. When pin 15b reaches cam portion $3b_4$, engaging plate 15 is moved leftward again and reaches the terminal of cam portion $3b_4$.

Accordingly, when pin 15b is located in arc portion $3b_1$ and the terminal of cam portion $3b_4$ and engaging plate 15 is moved leftward, the end of engaging plate 15 contacts an end face of arm portion 6b of slide plate 6 to prevent the sliding movement of the slide plate, as shown in FIGS. 8 and 10.

Figure 9:
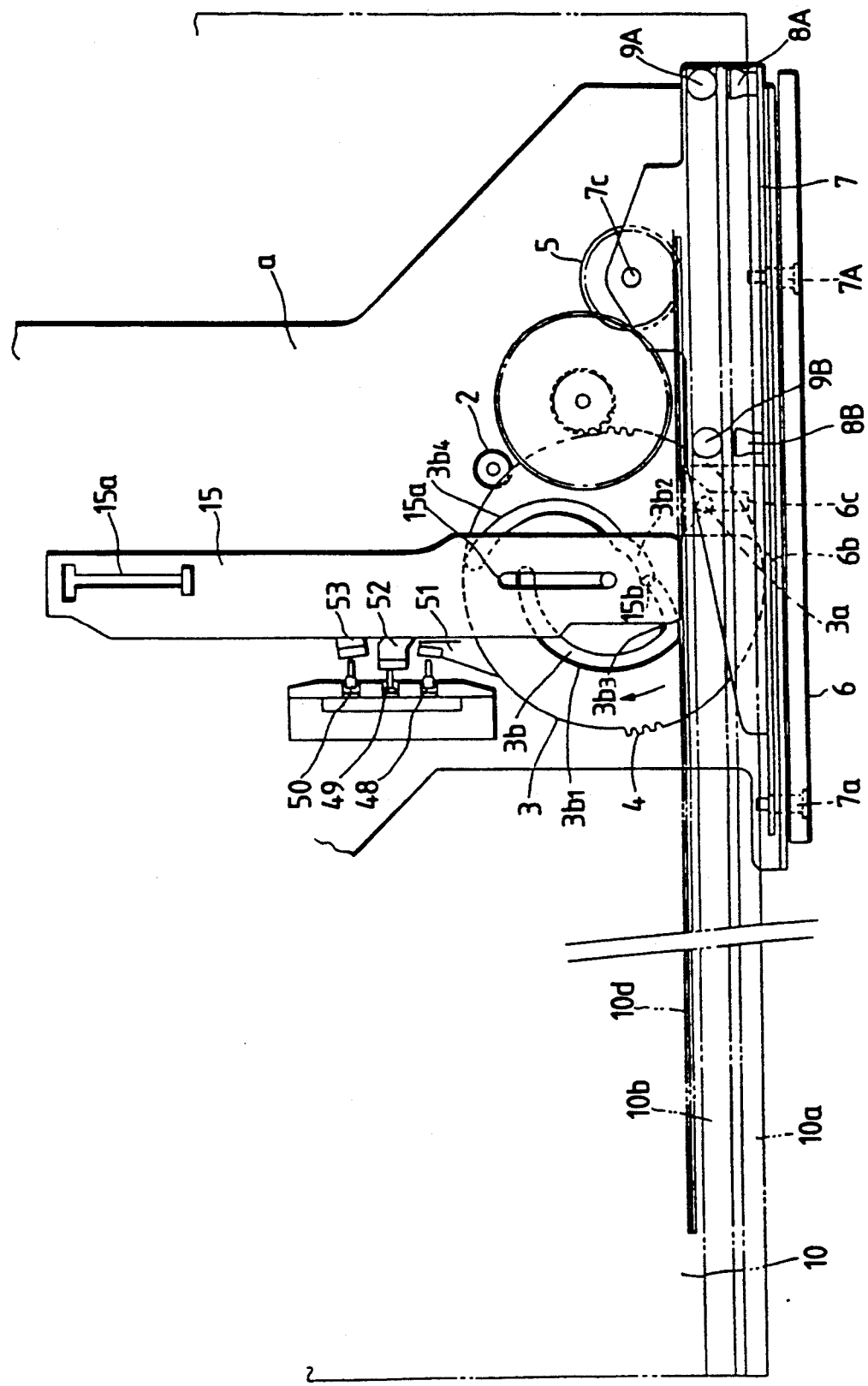

When pin 15b is located in arc portion $3b_2$ and engaging plate 15 is moved rightward as shown in FIG. 9, the prevention of the above sliding movement by arm portion 6b is released. At this time, pin 3a of cam gear 3 enters and presses groove 6c to slide plate 6.

Tension spring 17 is disposed between engaging plate 15 and guide portion 16B to bias engaging plate 15 rightward in FIG. 5(a).

Figure 13:
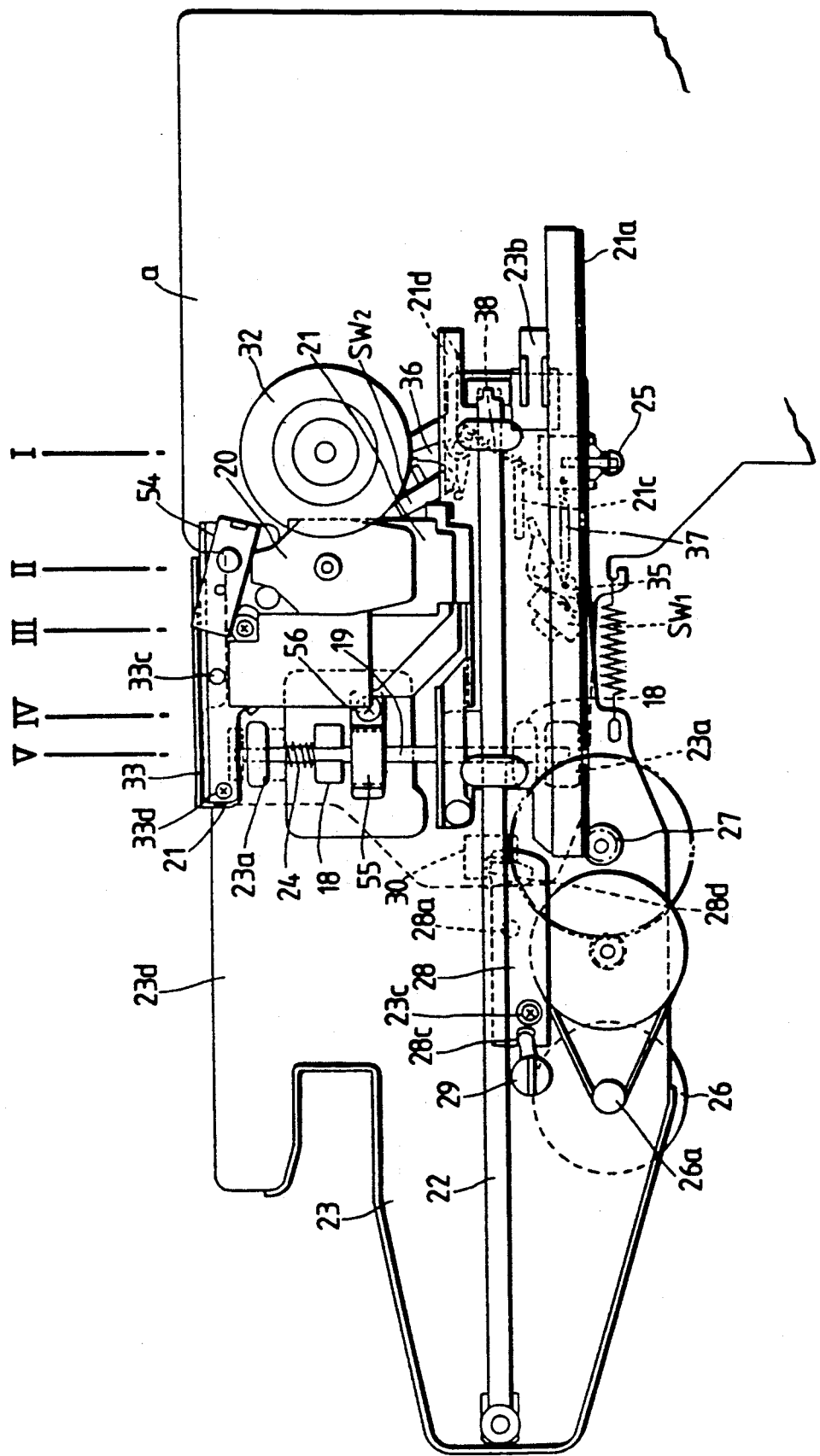
FIG. 13 is a plan view of an optical pickup operating section.
Figure 14:
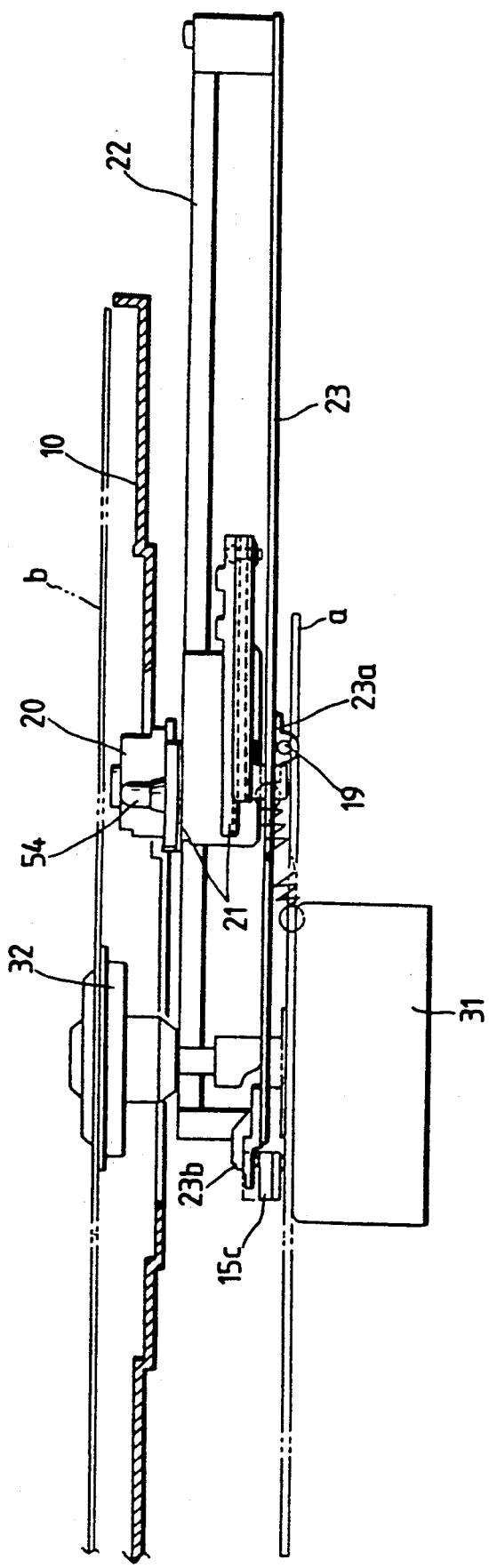
FIGS. 14 and 15 are side views showing the tilting operation of the optical pickup operating section.
Figure 15:
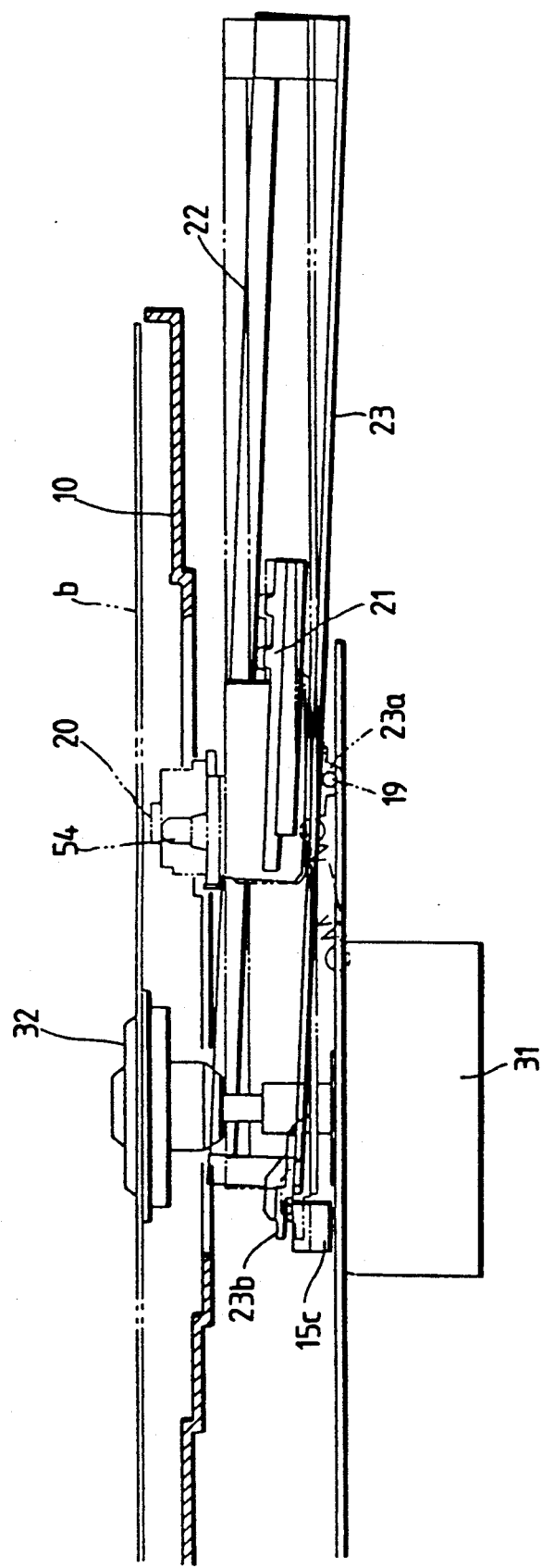

As shown in FIGS. 13 to 15, shaft 19 is supported by two shaft portions 18 open on the upper face of chassis a. Guide shaft 22 for guiding attaching body 21 of optical pickup 20 is attached to support plate 23. Two shaft portions 23a of support plate 23 are supported by shaft 19 outside shaft portion 18. Accordingly, when shaft 19 is inserted and attached to shaft portion 23a and is then inserted to shaft portion 18 from above, support plate 23 is pivotally supported by chassis a and shaft 19 is prevented from being pulled out since stopper plate 55 for fixing the upper face of shaft 19 is fixed to chassis a by screw 56. When the screw 56 is unfastened to detach stopper plate 55, support plate 23 and the parts attached thereto can be detached from chassis a.

Pressure spring 24 is disposed between shaft portions 18 and 23a to bias support plate 23 upwards in FIG. 13. Tension spring 25 is disposed on one side of support plate 23 between support plate 23 and chassis a to bias this side of support plate 23 downwards. Support plate 23 can move in a seesaw fashion against tension spring 25 around shaft 19.

Contact piece 23b is attached to one end of the support plate 23 on the downward biased side thereof, and contact piece 23b is pressed to push-up cam 15c (shown in FIG. 14) of the above engaging plate 15 by the biasing force of tension spring 25 as shown in FIG. 13.

Figure 5B:
FIG. 5(b) is a cross-sectional view of a push-up cam in FIG. 5(a)

Accordingly, support plate 23 is moved in seesaw fashion, as mentioned above, in accordance with the movement of engaging plate 15. As shown in FIG. 5b, push-up cam 15c is composed of slanting portion $15c_1$, horizontal portion $15c_2$ and slanting portion $15c_3$. In particular, horizontal portion $15c_2$ is set to have a height such that support plate 23 is horizontally oriented.

Motor 26 is attached to this support plate 23, and rack 21a of the above attaching body 21 is engaged with gear 27 driven by pulley 26a of motor 26 through an associated mechanism. Attaching body 21 is guided and linearly moved by guide shaft 22 by the rotation of motor 26.

Figure 16:
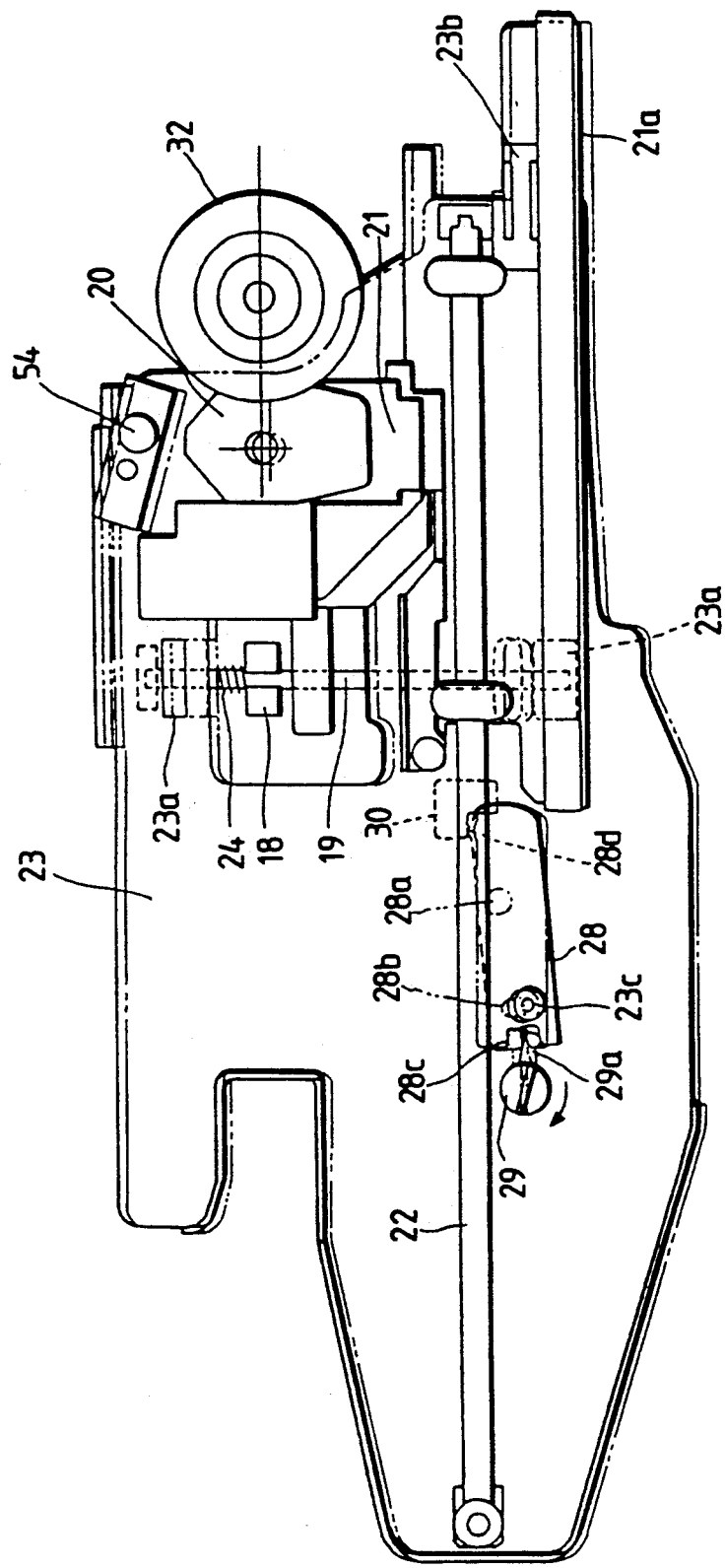
FIG. 16 is a side view showing the adjustment of the moving axis of the optical pickup.
Figure 18:
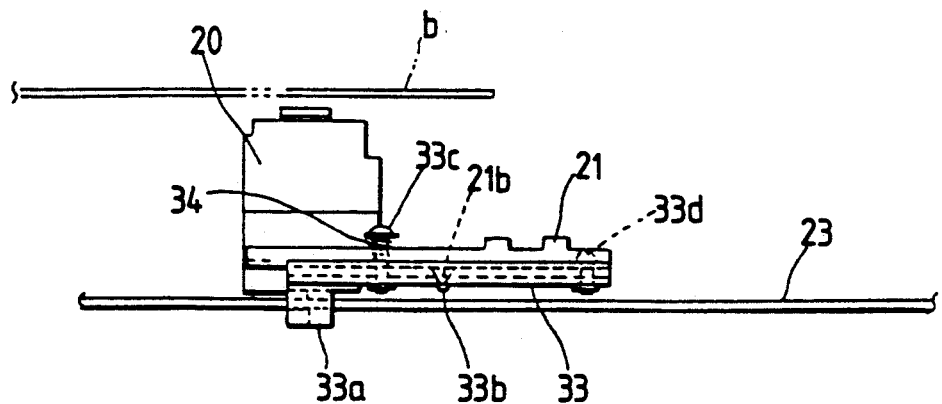
FIGS. 18 and 19 are side views showing this tangential adjustment section.
Figure 19:
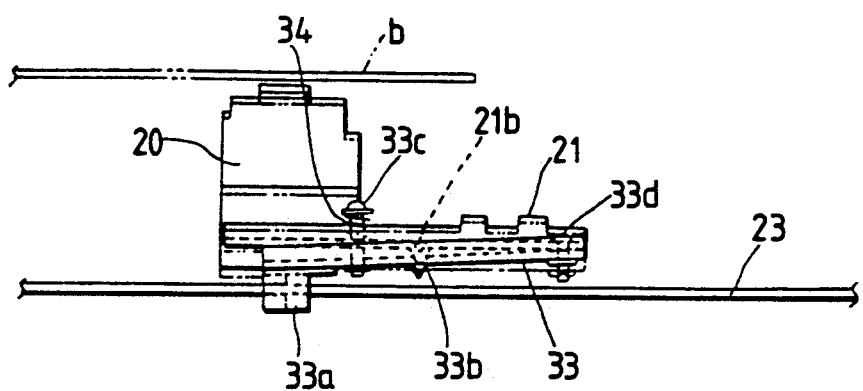
Figure 20:
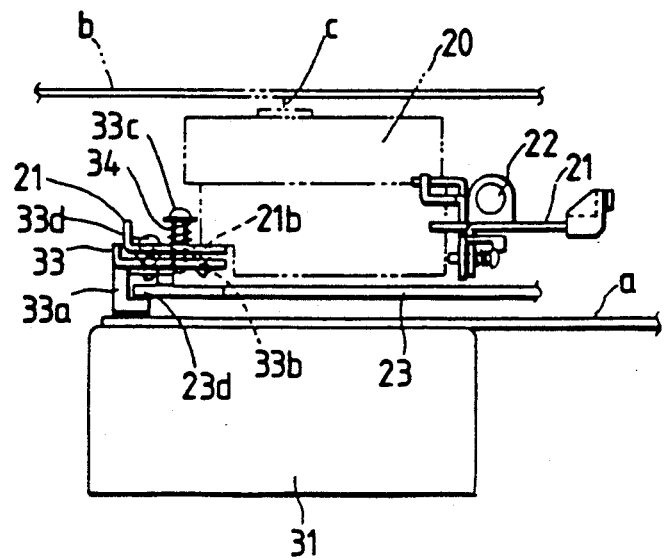
FIG. 20 is a front view of the tangential adjusting section.
Figure 23:
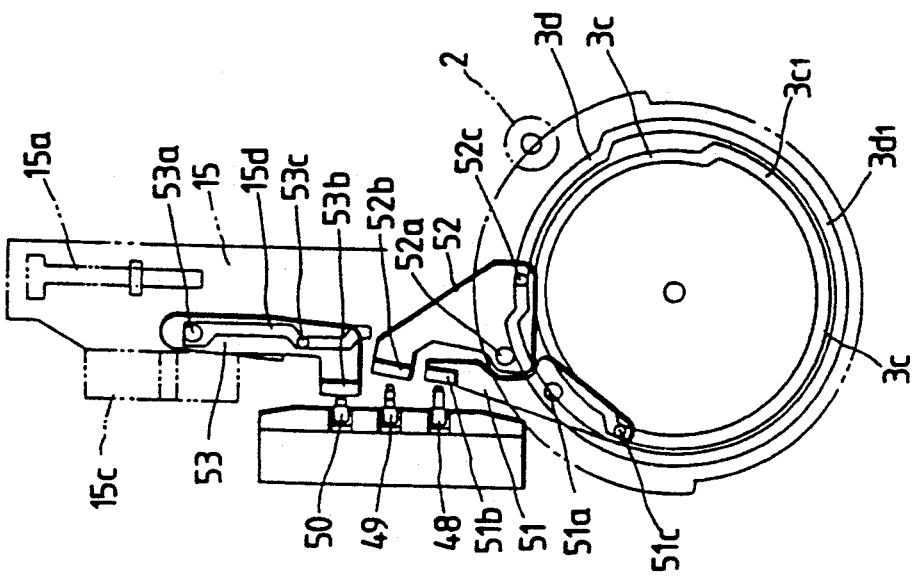
FIGS. 22 to 25 are plan views showing operating states of switches by the rotation of a cam gear.
Figure 22:
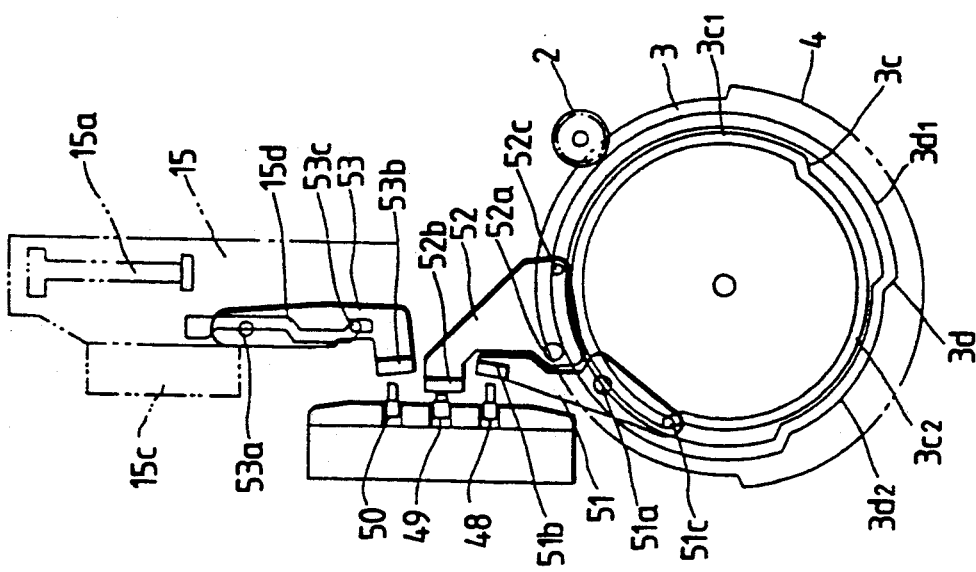
Figure 24:
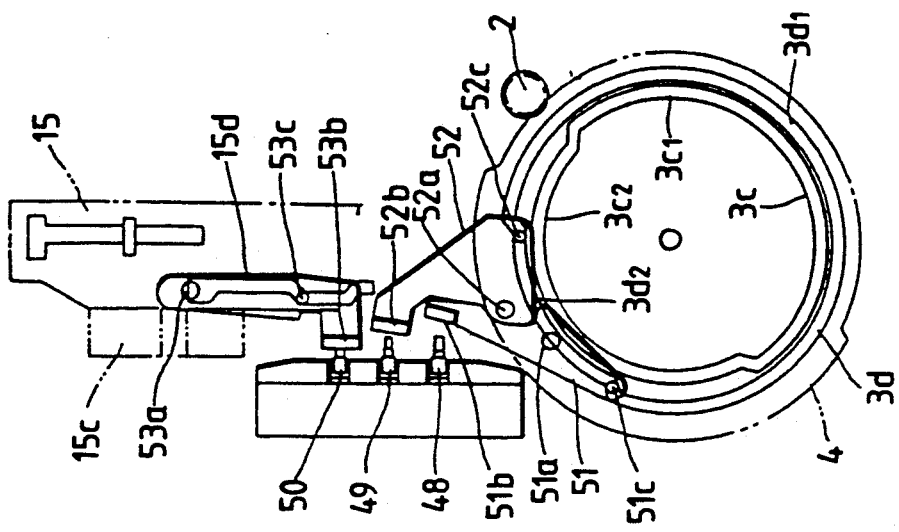

Further, as shown in FIG. 16, shaft 28a of rotary plate 28 is rotatably attached to support plate 23, and rotary plate 28 is fixed by screw 23c to support plate 23 through elongated hole 28b of rotary plate 28 so that the rotation of rotary plate 28 is prevented.

Recessed portion 28c is disposed at an end of this rotary plate 28, and projecting piece 29a of rotary piece 29 is rotatably attached to support plate 23 and is inserted into this recessed portion 28c. Accordingly, when rotary piece 29 is rotated by unfastening screw 23c, recessed portion 28c is pressed towards this projecting piece 29a and rotary plate 28 is thereby rotated. When screw 23c is fastened, rotary plate 28 is fixed in position.

Projecting portion 28d is formed at the other end of this rotary plate 28 and contacts, via the biasing force of pressure spring 24, contact piece 30 fixed to chassis a. Accordingly, when rotary plate 28 is rotated (around a broken line shown in FIG. 16 as mentioned above), support plate 23 is moved until the position of the phantom line against the biasing force of pressure spring 24. Thus, support plate 23 can be adjusted such that the optical axis of optical pickup 20 is moved on the central line of turntable 32 attached to spindle motor 31.

On the other hand, as shown in FIGS. 17 to 20, recessed portion 33b is disposed on an upper face of auxiliary attaching plate 33 to which is attached slide piece 33a sliding along one side 23d of support plate 23. Pressure spring 34 is disposed between attaching body 21 and one end of screw 33c, and screw 33c is vertically screwed to auxiliary attaching plate 33. This recessed portion 33b is in pressure contact with projecting portion 21b projecting from the lower face of attaching body 21 due to the biasing force of pressure spring 34. Accordingly, auxiliary attaching plate 33 can move in seesaw fashion against pressure spring 34 with the point contact between projecting portion 21b and recessed portion 33b as a center.

Screw 33d is screwed into auxiliary attaching plate 33 and extends through attaching body 21. Accordingly, when this screw is 33d is fastened, auxiliary attaching plate 33 compresses pressure spring 34 as mentioned before and is rotated as shown in FIG. 19, lifting up this side of attaching body 21.

In contrast to this operation, when screw 33d is unfastened, attaching plate 33 is rotated by the biasing force of pressure spring 34 in the direction opposite to the above direction so that this side of attaching body 21 is lowered.

Therefore, attaching body 21 is rotated around guide shaft 22 so that the optical axis of optical pickup 20 attached to this attaching body 21 can be adjusted in inclination in a direction perpendicular to the moving direction of optical disk b. Namely, optical pickup 20 is tangentially adjusted.

As shown in FIG. 13, two cam pieces 21c, 21d are disposed on the lower face of attaching body 21. Operating pieces 35, 36 operated by cam pieces 21c, 21d and switches $SW_1$, and $SW_2$, are attached to chassis a. Tension springs 37, 38 are tensioned in operating pieces 35, 36 in a direction in which these tension springs are separated from switches $SW_1$, $SW_2$.

Figure 28:
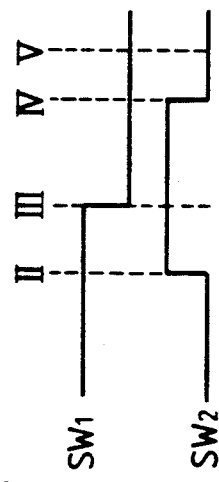
FIG. 28 is a diagram showing the position of the optical pickup and the operating states of the switches.

As shown in FIG. 28, when the optical axis of optical pickup 20 is moved to position III separated by about 37 mm from central position I of turntable 32, switch $SW_1$ is turned on by pushing operating piece 35 by cam piece 21c against the biasing force of tension spring 37.

Switch $SW_2$ is pushed and turned on by operating piece 36 since cam piece 21d pushes operating piece 36 against tension spring 38 in position III in which the optical axis of the optical pickup 20 is separated by about 26 mm from position I.

In position IV separated by 55 mm from position I, cam piece 21d is separated from operating piece 36 so that operating piece 36 is rotated by the tension of tension spring 38, thereby turning off switch $SW_2$.

Pickup 20 stops and is in a standby state in position V in which the optical axis of the optical pickup is separated by 63 mm from position I.

Figure 2:
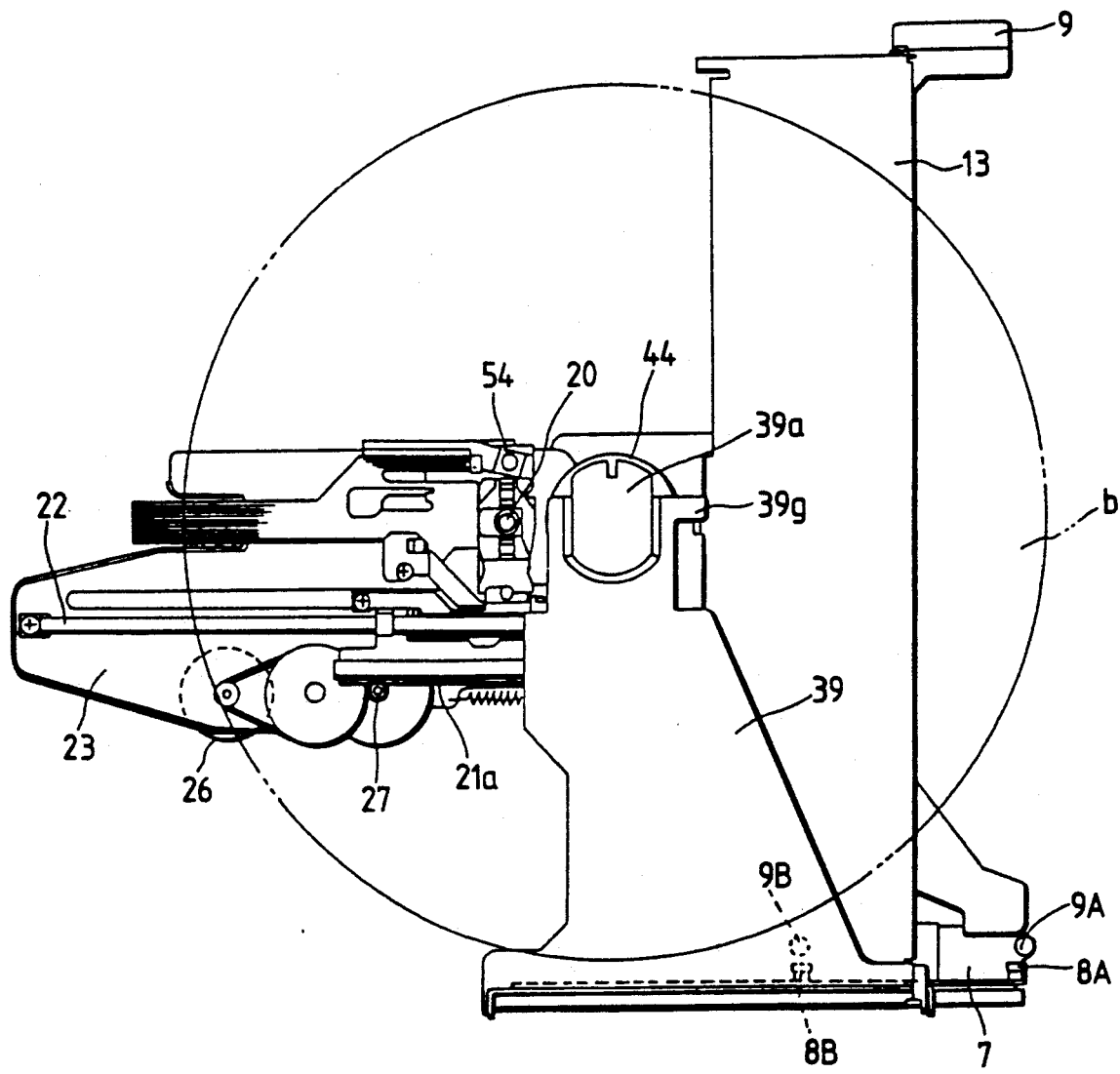
FIG. 2 is a plan view of the optical disk reproducing apparatus from which the cover has been removed.

Further, as shown in FIGS. 2 and 3, clamper attaching plate 39 is rotatably attached by shaft 40 onto one side of chassis a. Tension spring 41 is disposed between this clamper attaching plate 39 and the above arm plate 13. As shown in FIG. 21, projecting portion 13c of arm plate 13 and projecting piece 39g of clamper attaching plate 39 are held in contact with each other by the biasing force of tension spring 41. Accordingly, when the end of arm plate 13 is lowered, clamper attaching plate 39 is pulled by tension spring 41 so that the end of clamper attaching plate 39 is also lowered. When the end of arm plate 13 is raised, projecting piece 39g is pushed upwards, projecting portion 13c and the end of clamper attaching plate 39 is also raised.

Recessed portion 39a is formed in an end portion of clamper attaching plate 39. This recessed portion 39a and clamper 42 can be rotated into contact with each other through ball member 43.

Projecting portion 44a is disposed on one inner side of clamper housing body 44 housing this clamper 42, and projecting strip 44b projects on the other outer side of clamper housing body 44.

In this clamper housing body 44, projecting portion 44a is inserted into recessed portion 39b of clamper attaching plate 39 from the lower side thereof, and projecting strip 44b *is inserted* into recessed portion 39c. Thus, clamper housing body 44 cannot be moved in the direction of arrow A with respect to clamper attaching plate 39.

Opposite recessed portion 44c is formed on the inner left and right faces perpendicular to a line connecting projecting portion 44a and projecting stripe 44b of clamper housing body 44. Projecting pins 45a project on the left and right sides of clamper support body 45 and are inserted into this recessed portion 44c.

Shaft portion 45b is disposed at a base end of clamper support body 45 and is inserted into recessed portion 39d of clamper attaching plate 39 so that shaft portion 45b is prevented from being pulled out of recessed portion 39d by projecting piece 46a of washer 46 fixed by screw 39e screwed into clamper attaching plate 39.

One end of leaf spring 47 fixed to clamper attaching plate 39 by screw 39c is in pressure contact with this clamper support body 45 to bias projecting pin 45a downward. Further, L-shaped projecting walls 44d are formed on the front and rear sides of clamper housing body 44, and projecting portions 13d of arm plate 13 are inserted between projecting walls 44d so as to prevent clamper housing body 44 from being moved in the direction of arrow B.

When arm plate 13 is raised, projecting portion 13d hits against the upper faces of L-shaped projecting walls 44d so that clamper housing body 44 is raised at an angle parallel to the end of arm plate 13. Since clamper housing body 44 is supported parallel to clamper support body 45 as mentioned before, clamper housing body 44 and clamper 42 housed therein are held in a horizontal state while being raised. As shown in FIGS. 4, and 22 to 25, three switches $SW_3$, $SW_4$, and $SW_5$ are attached to chassis a and have respective operating pieces 48, 49 and 50 for turning these switches on and off. Two cam grooves 3c, 3d respectively connect large diameter portions $3c_1$, $3d_1$ to small diameter portion $3c_2$, $3d_2$ and are formed on the lower face of cam gear 3.

Pin 51a is pivotally supported by chassis a. Lever 51 has pushing portion 51b for pushing operating piece 48 and pin 51c inserted into cam groove 3c. Pin 52a is pivotally supported by chassis a, and pin 52 has pushing portion 52b for pushing operating piece 49 and pin 52c inserted into cam groove 3d. Accordingly, when pin 51c reaches small diameter portion $3c_2$, lever 51 is rotated, whereupon its pushing portion 51b pushes operating piece 48 so that switch $SW_3$ is turned on. When pin 51c reaches small diameter portion $3c_1$, lever 51 is rotated in the opposite direction and pushing portion 51b is separated from operating piece 48 so that switch $SW_3$ is turned off. Similarly, switch $SW_4$ is also turned on by large diameter portion $3d_1$ and is turned off by small diameter portion $3d_2$.

Cam groove 15d is also formed on the lower face of engaging plate 15 and pin 53a is pivotally supported by chassis a. Lever 53 has pushing portion 53b for pushing operating piece 50 and pin 53c inserted into cam groove 15d. Accordingly, lever 53 is rotated by moving engaging plate 15 in the vertical direction in FIG. 25 and pushing 53b pushes operating piece 50 or is separated from operating piece 50 so that switch $SW_5$ is turned on and off.

As shown in FIGS. 13 to 16, and 27, tilt sensor 54 is attached to attaching body 21 of the optical pickup 20 and is inclined at an angle of 15 degrees with respect to optical pickup 20 at a position approaching the side of central position I of turntable 32 1.29 mm from a position perpendicular to the moving direction of optical pickup 20.

This tilt sensor 54 has light-emitting unit 54a and light-detecting units 54b and 54c disposed on both sides of light-emitting unit 54a. Light emitted from light-emitting unit 54 is reflected by optical disk b.

When optical disk b is tilted with respect to tilt sensor 54, a difference in the amount of light received by light-detecting units 54b and 54c is caused, and hence the tilt of optical disk b is detected.

The operation of this optical disk reproducing apparatus will next be described from an ejecting position thereof.

FIGS. 1, 3, 4, 8, 14 and 22 show the operating state of the optical disk reproducing apparatus in this ejection position.

In this state, a video disk having a diameter of 30 or 25 cm, or a video or digital audio disk having a diameter of 12 cm is mounted on tray 10. Motor 1 is rotated when reproducing commands are issued to reproduce the disk b.

When cam gear 3 is rotated by motor 1 in the direction of arrow D in FIG. 8, toothless gear 4 integral with cam gear 3 is rotated and longitudinal gear 5 engaged with gear 4 is then driven.

Rack 10d of tray 10 is engaged with this longitudinal gear 5 so that tray 10 is moved as shown in FIGS. 6(a) and 9 while guide grooves 10a, 10b are guided by rollers 8A, 8B, 9A and 9B of elevating plate 7 and guide groove 10c is guided by roller 11 of chassis a and roller 13A of arm plate 13.

Figure 26:
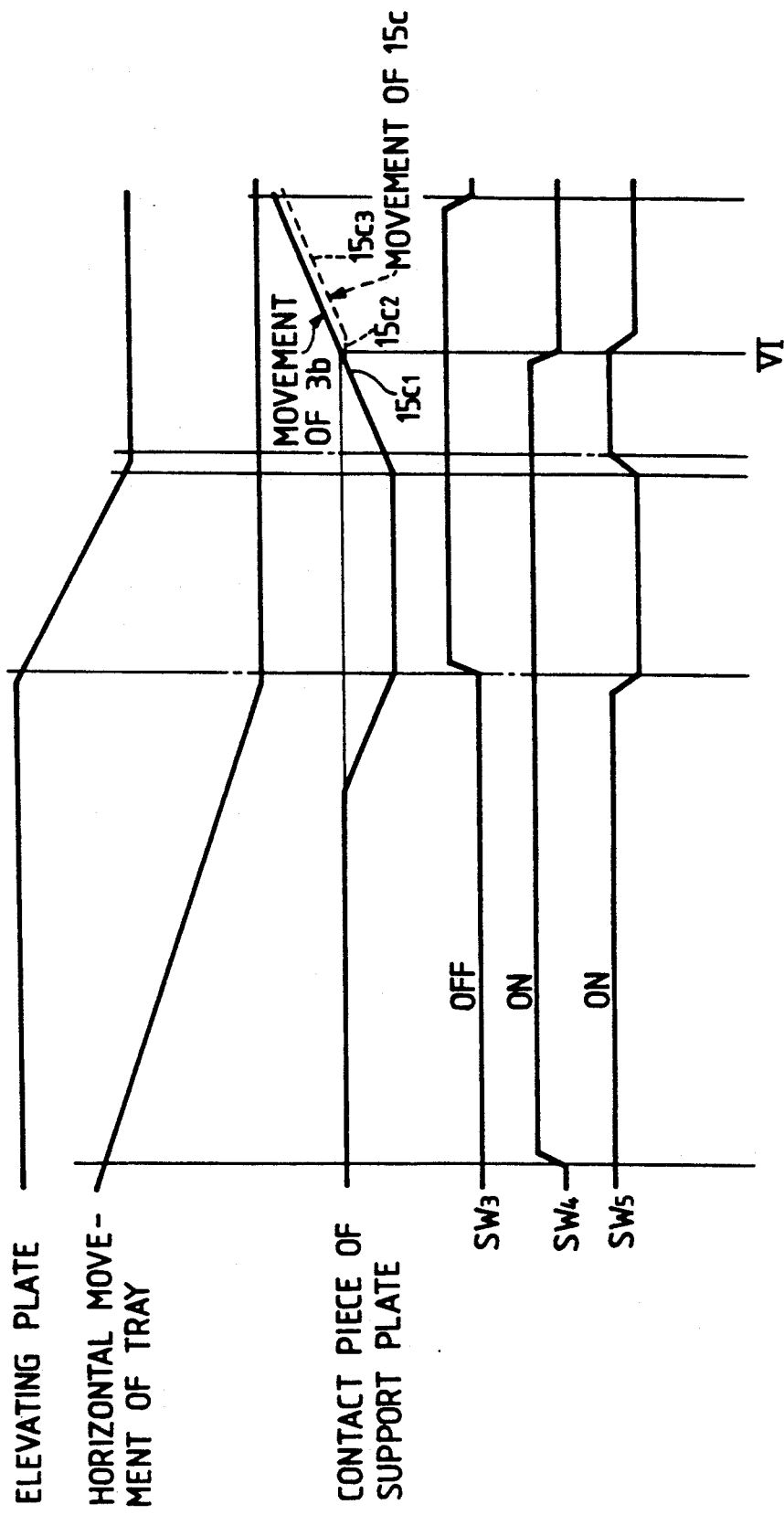
FIG. 26 is a diagram showing the detection of operating states of respective portions by the operation of these switches.

An end portion of guide groove 10a then reaches rollers 8A and 9A and an upper opening in an end portion of guide groove 10c reaches roller 11. Namely, tray 10 is pulled into the reproducing apparatus as shown in FIG. 6(a). When tray 10 has been completely pulled into the reproducing apparatus, the drive of longitudinal gear 5 is interrupted by a portion of toothless gear 4 so that tray 10 is stopped in position. At this time, pin 52c located in small diameter portion $3d_1$ is moved to large diameter portion $3d_2$ by the rotation of cam gear 3 so that switch $SW_4$ is turned, on as shown in FIG. 26, and it is detected that motor 1 has begun to rotate.

At the ejecting time, switch $SW_4$ is turned off after the ejecting operation has been completed so that the operation of motor 1 is stopped.

As mentioned above, before tray 10 is pulled into the position thereof shown in FIG. 6(a), arc portion $3b_1$ of cam groove 3b of engaging plate 15 and cam portion $3b_3$ begins to contact pin 15b. Accordingly, engaging plate 15 is moved rightward to the position thereof shown in FIG. 5, and arm portion 6b is disengaged from engaging plate 15 so that slide plate 6 can be slid. Thus, when engaging plate 15 is moved rightward, switch $SW_5$, is turned off, as shown in FIG. 26, by cam groove 15d and lever 53, whereupon it is detected that the horizontal movement of tray 10 has been completed.

Before engaging plate 15 is moved as shown in FIG. 5 and arm portion 6b is disengaged from engaging plate 15, pin 3a of cam gear 3 is moved into Y-shaped groove 6c. When arm portion 6b is disengaged from engaging plate 15 and pin 15b reaches arc portion $3b_2$ and engaging plate 15 is held in its position, groove 6c is pushed by pin 3d and, as shown in FIG. 7(a), slide plate 6 is thereby moved leftward with respect to the position thereof in FIG. 6(a).

Therefore, pin 7a is guided by cam hole 6a of slide plate 6 and elevating plate 7 is lowered so that tray 10, in which guide grooves 10a, 10b are inserted into rollers 8A, 8B, 9A and 9B of elevating plate 7, begins to be lowered together with elevating plate 7. At this time, since the upper opening in the end portion of groove 10c on the opposite slide of tray 10 is located in the position of roller 11, roller 11 can be pulled out of this upper opening.

Arm plate 13 having pin 13b inserted into connecting hole 7b of elevating plate 7 is rotated in a direction in which the end of arm plate 13 is lowered since pin 13b is lowered together with elevating plate 7. Accordingly, roller 13A of arm plate 13 is also lowered by the same lowering amount as that of elevating plate 7 and pushes guide groove 10c down to pull it out of roller 11, thereby lowering this side of tray 11.

By such a lowering movement of tray 10, disk b mounted on this tray 10 is moved onto turntable 32.

On the other hand, a lower portion of push-up cam 15c is moved to the position of contact piece 23b of support plate 23 by moving engaging plate 15 as shown in FIG. 5 so that contact piece 23b is lowered, as shown in FIG. 26.

When elevating plate 7 has been completely lowered by the movement of slide plate 6, engaging plate 15 begins to be moved in the opposite direction again by cam portion $3b_4$ and switch $SW_5$ is turned on, thereby detecting the completion of the lowering operation of elevating plate 7. The end of arm plate 13 is rotated downwards such that the end of clamper attaching plate 39 is lowered by tension spring 41. Therefore as mentioned before, clamper 42, which is horizontally oriented while it is raised, is placed on disk b on turntable 32.

The lowering of the end of arm plate 13 continues until clamper 42 rotates clamper support body 45 by the biasing force of leaf spring 47 and extends tension spring 41 so that the lowering movement of the end of arm plate 13 stops. Then clamper 42 pushes disk b towards turntable 32 and disk b is rotated by the rotation of spindle motor 31.

The completion of the clamping operation is detected by detecting that the lowering movement of elevating plate 7 has been completed.

As mentioned before, when tray 10 is horizontally moved, tray 10 is horizontally supported by four rollers 8A, 8B, 11 and 13A. When tray 10 is vertically moved, tray 10 is supported by three rollers 8A, 8B and 13A.

If arm plate 13 is twisted due to a difference in the amount of resistance, size, etc., a gap in height between rollers 8A, 8B on one side of tray 10 and roller 13A on the other side thereof is caused, thereby inclining tray 10.

Figure 12:
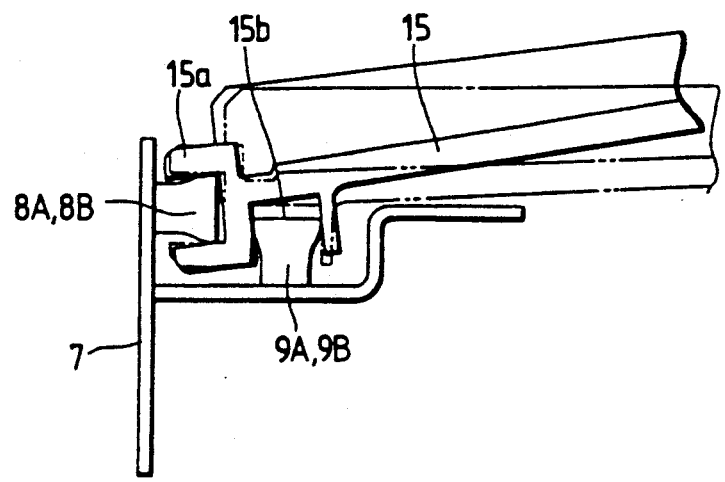
Figure 17:
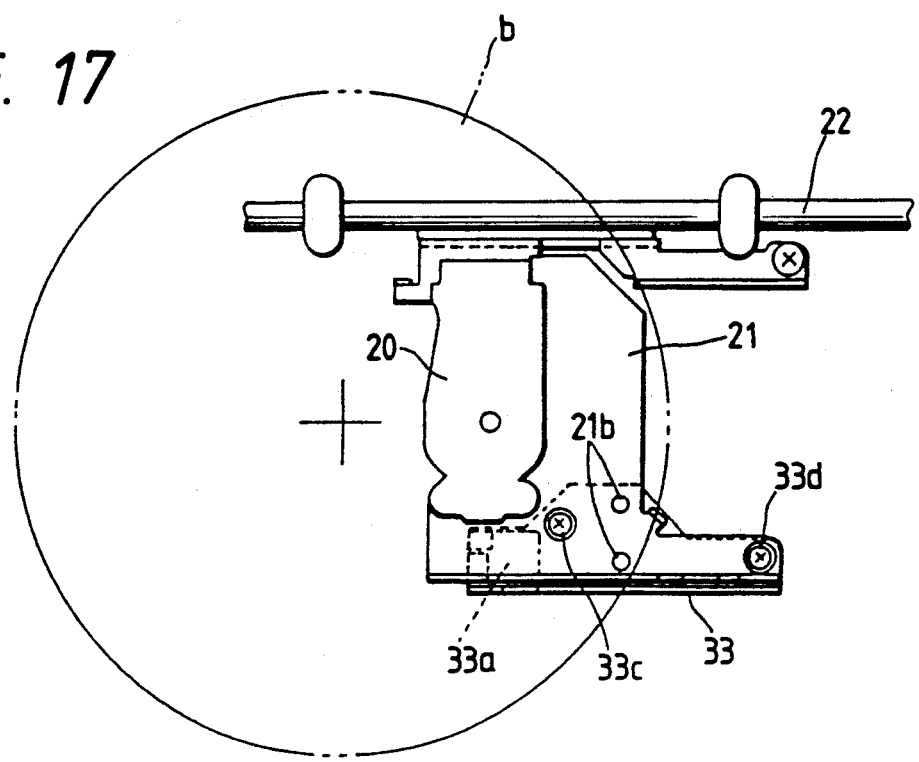
FIG. 17 is a plan view of a tangential adjusting section of the optical pickup.

In such a case, guide grooves 10a, 10b and 10c are tilted with respect to rollers 8A, 8B, 9A, 9B and 13A at a tilt angle as shown in FIG. 12.

Figure 11:
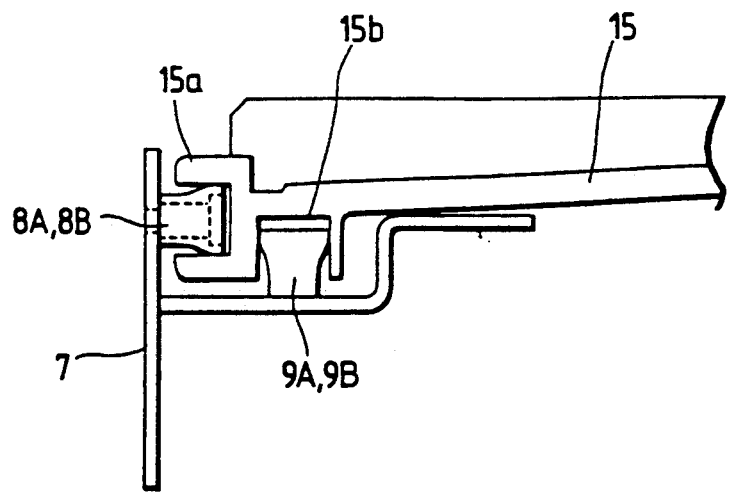
FIGS. 11 and 12 are front views showing the relation between a roller and a guide groove of the tray.

If rollers, 8A, 8B, 9A, 9B and 13A have a cylindrical shape, these rollers can move or eat into guide grooves 10a, 10b and 10c and thus deform these guide grooves, preventing the smooth sliding movement thereof. To prevent such a situation, as shown in FIGS. 3 and 11, roller 8A, 8B, 9A, 9B, 11 and 13A have a spherically expansive shape at ends thereof to prevent these rollers from moving into guide grooves 10a, 10b and 10c.

Thus, even after disk b is moved onto turntable 32 and the clamping operation is completed by clamper 42, cam gear 3 continues to rotate until pin 15b reaches cam portion $3b_4$ of cam groove 3b so that engaging plate 15 is moved leftward in FIG. 5 and engages with arm portion 6b, thereby preventing the movement of slide plate 6. At this time, since pin 3a is pulled out of the Y-shaped divergent portion of groove 6c, slide plate 6 is not moved, even if cam gear 3 continues to rotate.

Figure 25:
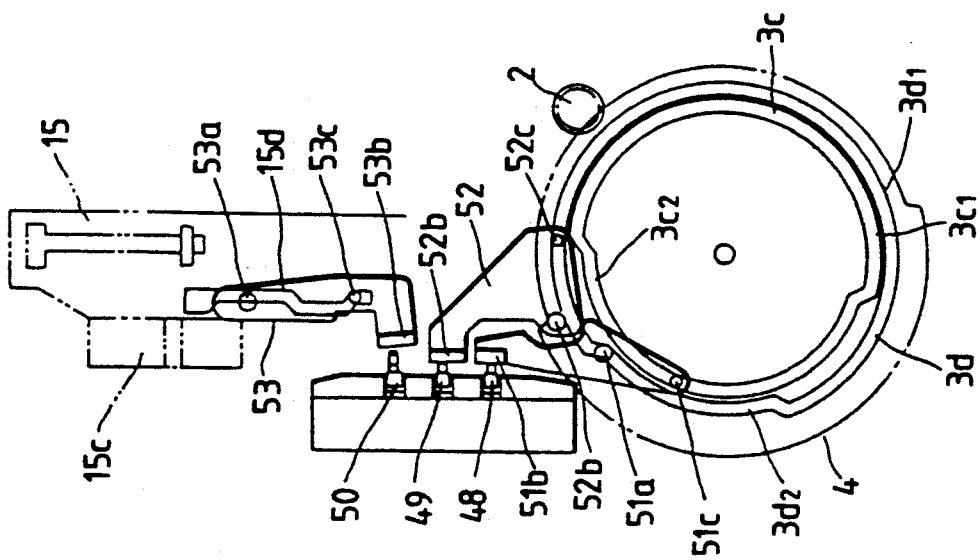

As mentioned above, push-up cam 15c begins to push contact piece 23b upward against the biasing force of tension spring 25 by the leftward movement of engaging plate 15. When an intermediate portion of cam portion $3b_4$ of cam groove 3b reaches the position of pin 15b, as shown in FIG. 25, pin 52 reaches small diameter portion $3d_2$ of cam groove 3d so that switch $SW_4$ is turned off. It is then detected that horizontal portion $15c_2$ of push-up cam 15c has reached contact piece 23b and support plate 23 approximately becomes horizontal with shaft 19 as a center, thereby stopping the operation of motor 1. If contact piece 23b passes beyond horizontal portion $15c_2$ due to overrunning of the motor, etc., pin 53c is moved by cam groove 15d and switch $SW_5$ is turned off by lever 53. Namely, support plate 23 is horizontal in a position at which switch $SW_4$ is turned off and switch $SW_5$ is turned on.

At this time, the optical axis of optical pickup 20 is located in position V separated by 63 mm from the center of turntable 32 in FIG. 13, and the above switches $SW_1$ and $SW_2$ are turned off as shown in FIG. 28.

Figure 29:
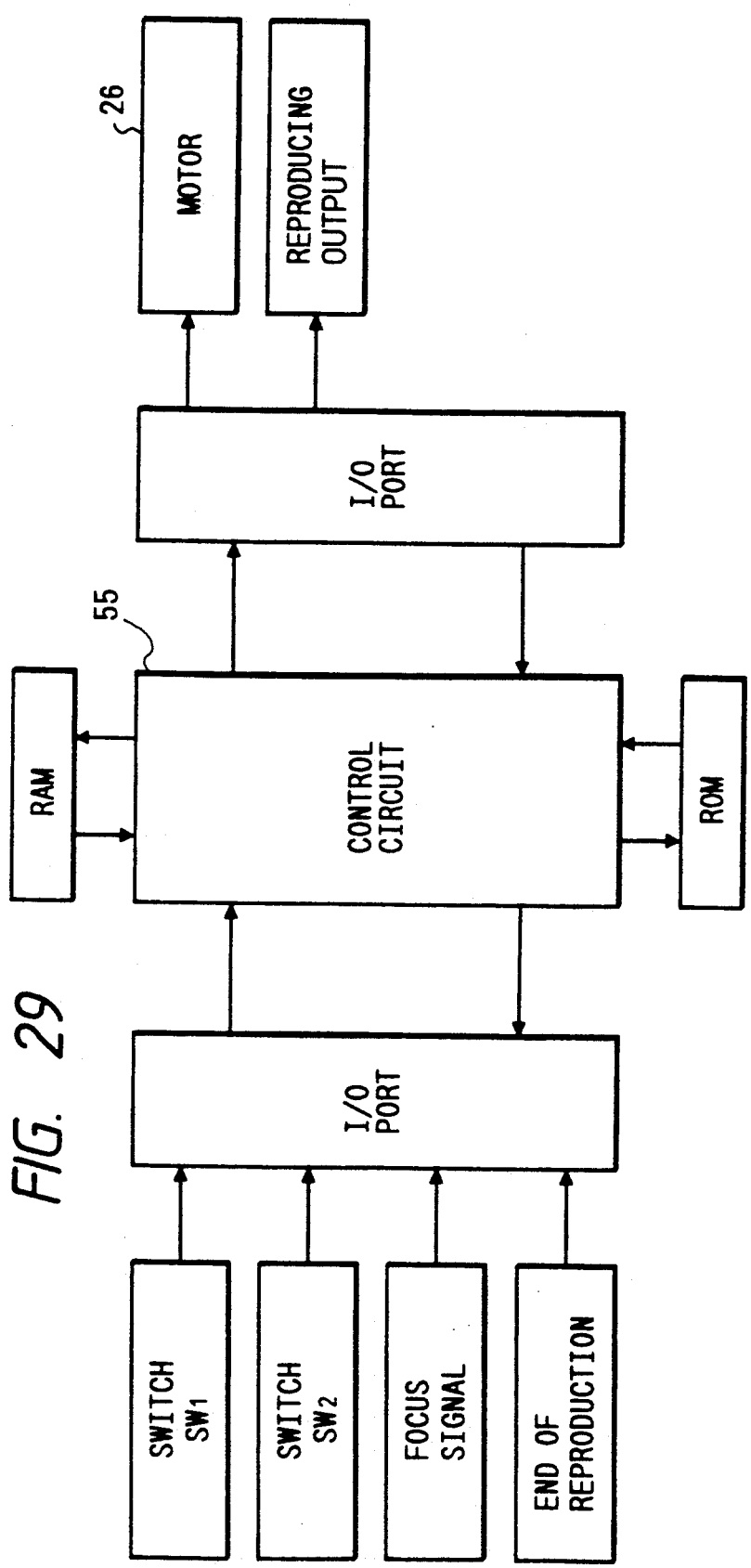
FIG. 29 is a block diagram of an operating circuit including a control circuit.
Figure 30:
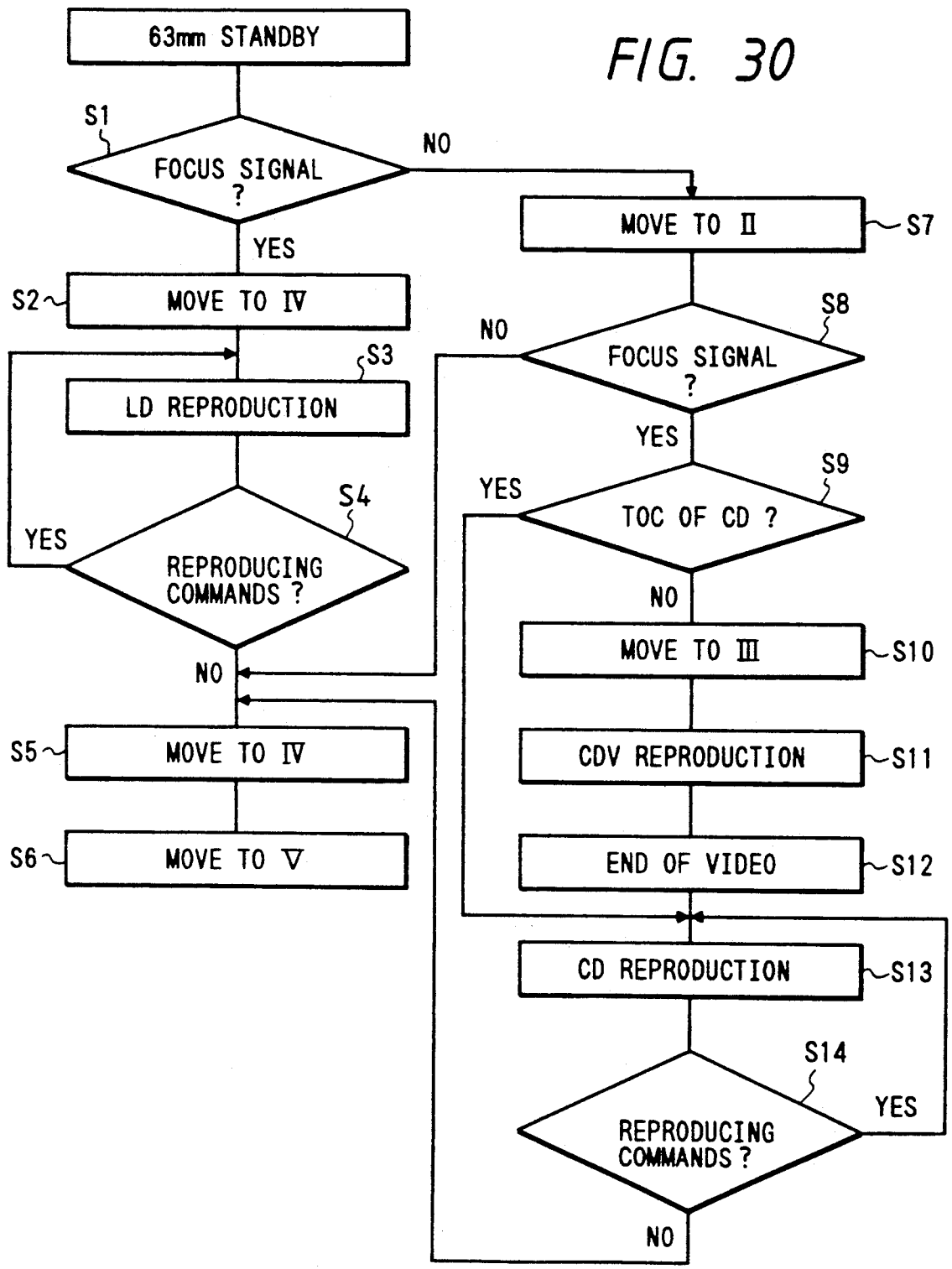
FIG. 30 is a flow chart showing the operation of the circuit of FIG. 29.
Figure 31:
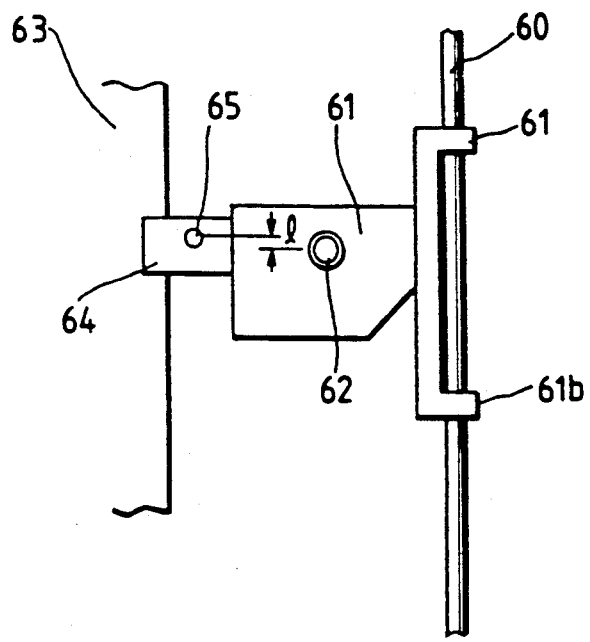
FIGS. 31 and 32 depict a conventional optical pickup adjusting device for an optical disk reproducing apparatus.
Figure 32:
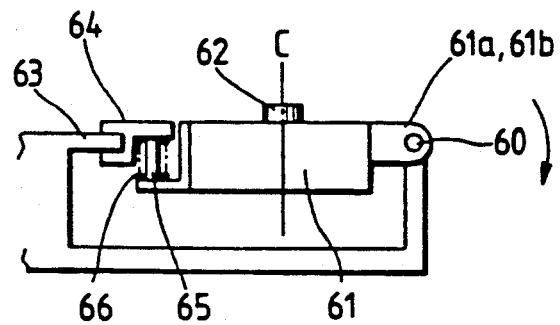

FIG. 29 is a block diagram of a circuit for performing rotary control of motor 26 and reproducing output PO of optical pickup 20 by switches $SW_1$ and $SW_2$ and focus signal FS of optical pickup 20. FIG. 30 is a flow chart showing the operation of this circuit.

In these figures, reference numeral 55 designates a control circuit, I/O, an input/output port, ROM, a read-only memory, and RAM designates a random access memory.

As mentioned above, when disk b is completely set and switches $SW_1$ and $SW_2$ are turned off, as shown in FIG. 30, optical pickup 20 tries to receive a focus signal produced by reflection of the light beam from the surface of disk b (step $S_1$). However, at this time, if disk b is not set on the turntable or has a diameter of 12 or 8 cm, the light beam is not reflected in the above position V so that no focus signal FS is present.

In the case of a video disk b having a diameter of 20 or 30 cm, focus signal FS is present, and thereby the optical axis of the pickup is moved in step $S_2$ to position IV in which switch $SW_2$ is turned on.

Since TOC information is recorded on the disk b in a position at a radius of about 55 mm with position IV as a center, optical pickup 20 reads the TOC information and the reproduction of disk b is performed in step $S_3$.

When this reproduction has been completed and the next reproducing commands are issued in step $S_4$, the process returns to step $S_3$ in accordance with the new reproducing commands in step $S_4$, thereby reproducing disk b.

However, if no reproducing commands are issued, the optical axis of pickup 20 passes through position IV in step $S_5$ and returns to position V in step $S_6$.

In the above-mentioned step $S_1$, if no focus signal FS is present, the optical axis of the pickup is moved to position II in which switch $SW_2$, which was turned on in step $S_7$, is turned off again.

In step $S_8$, the pickup is operated to obtain focus signal FS again. When no focus signal FS is obtained even in this step $S_8$, it is assumed that no disk b is present, whereupon the process proceeds to step $S_5$. However, if focus signal FS is present in the position II, a disk having a diameter of 12 or 8 cm is assumed to be present and TOC information of the digital audio disk recorded in a radial position of about 26 mm as this position II are read out in step $S_9$. When this information has been read, the reproduction thereof is performed with respect to the above disk in step $S_{10}$.

When reproduction has been completed and the next reproducing commands are issued in step $S_{14}$, the process returns to step $S_{13}$ in accordance with the present reproducing commands. If no reproducing commands are issued, the process returns to step $S_5$.

However, in the case of a CDV (compact disk including an image), the TOC information in the position II is read and the optical axis of the pickup is moved to position III in which switch $SW_4$ is turned on in step $S_{12}$, thereby reproducing the disk in step $S_{11}$.

In step $S_{12}$ in which the reproduction of the video portion has been completed, the process proceeds to step $S_{13}$ and reproduction of the audio disk is performed. While reproduction of disk b is performed, tilt sensor 54 continues to detect tilting of disk b during the reproduction of a video part section of the LD or CDV. When tilting of the disk is detected by this sensor, motor 1 is rotated in the normal or reverse direction in accordance with the tilting direction of the disk.

Thus, engaging plate 15 is moved in accordance with this rotation of motor 1 so that the push-up amount of contact piece 23b by push-up cam 15c is changed with position VI in FIG. 26 as a center and support plate 23 is tilted with shaft 19 as a center.

When the tilt of this support plate 23 is in conformity with the tilt of disk b and hence these members are rendered parallel to each other and the amounts of light received by the light-detecting units 54b and 54c are same, the operation of motor 1 is stopped.

Figure 27:
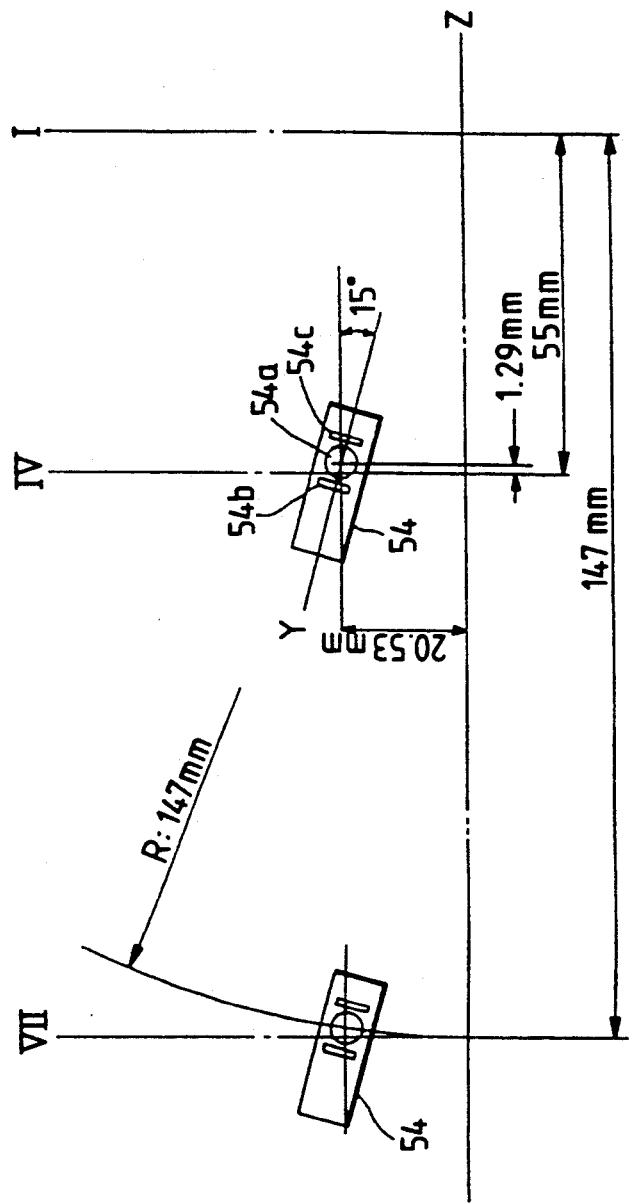
FIG. 27 is a plan view showing the operating position and angle of a tilt sensor.

Line Y connecting light-detecting units 54b, 54c and light-emitting unit 54a of tilt sensor 54 to each other is tilted at an angle of 15 degrees with respect to moving line Z of the optical axis of optical pickup 20, as shown in FIG. 27.

When line X connecting light-detecting units 54b, 54c and light-emitting unit 54a to each other is parallel to the conventional moving line Z, the tilt angle is between 21.4 degrees with respect to line Z at the reproduction of an innermost circumference of 55 mm of a disk b having a diameter 30 cm and an angle of 8 degrees with respect to line Z at the reproduction of an outermost circumference of 147 mm. Namely, this tilting angle is set on the basis of formula $(8+21.4)/2 = 14.7 = 15$.

The tilt sensor is shifted on the inner side by 1.29 or 3 mm from position VII of the optical axis of optical pickup 20 since the center of tilt sensor 54 is set at a position separated by 147 mm from center I of turntable 32 when position VII of the optical axis of the pickup is at the outermost circumference 147 mm.

If the deflection angle $\theta_T$ of disk b is two degrees at this time, detection angle $\theta_L$ of tilt sensor 54 is calculated by the following formula $$\theta_L = \tan^{-1} \frac{\tan \theta_T}{\cos \alpha}$$

In accordance with this formula, detection angle $\theta_L$ is 2.020 degrees at the inner circumference of the disk and is 2.013 degrees at the outer circumference of the disk.

Accordingly, the difference $\theta_T - \theta_L$ between detection angle $\theta_L$ and the real deflection angle $\theta_T$ is 0.02 degrees at the maximum. This difference is improved by 0.128 degrees in comparison with the conventional angle of 0.148 degrees.

As described above, in accordance with the present invention, a spherically expansive portion is formed in a portion of the roller inserted into the guide groove. Accordingly, even if the roller and the guide groove are not parallel to each other due to twisting, bending, etc., of the tray, the width of the guide groove contacting the spherically expansive portion of the roller is not affected.

Accordingly, even if the desired parallelism is lost, the s roller is prevented from moving or eating into the guide groove so that the roller and the guide groove are prevented from being deformed.

Therefore, the tray can be smoothly moved horizontally at all times, which is preferable for a loading device providing a three-point support structure temporarily as in the above embodiment.

As mentioned above, in accordance with the present invention, by moving the adjusting unit, a support plate acting as the attaching member for mounting the optical pickup thereon in such a manner as to be linearly movable is itself moved in a direction perpendicular to the moving direction of the optical pickup so that the moving direction of the optical pickup is made to align with a straight line passing through the center of the turntable.

Accordingly, if the adjusting unit is constructed by a rotary plate rotated around one point for example, the optical axis of the pickup can be adjusted continuously and finely.

Further, since the adjusting unit can be disposed in a position separated from the optical pickup, the adjusting unit can be located in a position in which the adjustment can be easily performed, even after the assembly of the apparatus. Therefore, the adjusting operation can be performed smoothly and easily.

Furthermore, the attaching member can be inclined in a seesaw-fashion with the axis thereof as a center so that the attaching member can be also used for adjusting the tilt of the optical pickup. In addition, the biasing force of the attaching member is restrained if vibration is transmitted to the attaching member.

As described above, in accordance with the present invention, the auxiliary attaching plate is pivotally attached to the attaching body and the auxiliary attaching plate is inclined around its pivotal support point when the distance between the attaching body and the auxiliary attaching plate is changed by the adjustment of the adjusting device on one side of the attaching body.

Therefore, the one side of the attaching body is raised or lowered in accordance with the inclination of the auxiliary attaching plate so that the attaching body is rotated around the guide shaft. Thus, the optical axis of the optical pickup can be vertically adjusted on a plane perpendicular to the guide shaft.

When this adjusting device is constructed with a screw and pressure ring as in the above-described embodiment, the tangential adjustment can be continuously performed by fastening and unfastening the screw.

Further, this adjusting device can be disposed in a location separated from the pickup in the direction of the guide shaft instead of to the side of the optical pickup as in the conventional device. That is, it is possible to dispose the adjusting device outside the outer diameter of the optical disk set on the turntable.

Accordingly, the tangential adjustment can be easily performed while the optical disk is set so that the tangential adjustment of the optical pickup can be simplified.

As further discussed above, in accordance with the present invention, when a cam gear as a rotary member is rotated, the engaging member is moved by a pin inserted into the cam groove in a direction in which the engaging member is separated from the slide member, thereby disengaging the arm portion from the engaging member. Thus, the pin of the rotary member is fitted into an engaging groove of the slide member and pushes the slide member so that the slide member is slid and the tray supported by this slide member is thereby lowered and an arm plate associated with the slide member is rotated. Thus, the optical disk is clamped by the clamper with respect to the turntable.

Thereafter, the pin of the rotary member is pulled out of the engaging groove and the slide member stops and the engaging member is moved by the cam groove towards the slide member, thereby performing the engagement of the slide member by action of the engaging member.

Accordingly, the positions of the tray and the clamper are secured and these members are efficiently operated at a desired timing by the rotation of one rotary member.

Further, in comparison with the conventional system for operating the tray and the clamper with separate cam mechanisms, the mechanism of the disk loading device is simplified and the optical disk reproducing apparatus is made compact and the stroke required for the mechanism is easily obtained.

As further discussed above, in accordance with the present invention, the clamper housing body is pivotally supported parallel to the pivotal support portion of the clamper attaching plate so that, if the clamper housing body is arranged in an X axis, this X axis is maintained parallel to the turntable at all times.

When the clamper is raised, the clamper housing body is pushed upwards parallel to the pivotal support portion of the arm plate by the push-up projection of the arm plate. Since the pivotal support portion of the arm plate is perpendicular to the pivotal support portion of the clamper attaching plate, the clamper housing body is also parallel to the turntable with respect to the Y axis when the clamper housing body is raised.

When the clamper housing body is raised, the clamper attaching plate is parallel to the turntable, and hence it suffices to maintain a minimum spacing required to set the optical disk between the clamper housing body and the turntable.

Therefore, it is not necessary to excessively raise the clamper as in the conventional apparatus, and no additional space is thereby required so that the height of the optical disk reproducing apparatus can be reduced. Further, since the mechanism of the apparatus is simplified, the disk clamping device can be inexpensively manufactured and it has a high reliability.

As yet further described above, by the rotation of a cam gear acting as a drive member, a slide plate acting an as elevating cam member and an engaging plate as an engaging member are respectively driven at appropriate times to raise and lower the clamper and hold the clamper in position.

When a deviation of the optical disk is detected during the reproduction thereof, the drive member is again rotated and the engaging member is moved in a state in which the engaging member is engaged with the elevating cam member. Then, the tilt cam of the engaging member is raised and lowered on one end of the attached member to perform the tilting operation.

Accordingly, the clamping movement and the tilting adjustment of the optical disk can be performed by the operation of the drive member, whereby only a single motor is required. Thus, the number of motors can be reduced compared with the conventional structure.

Further, since the engaging member performs the dual functions of engaging the elevating cam member and the tilting adjustment, the overall mechanism of the apparatus is simplified and the number of parts thereof reduced. Thus, the cost of the apparatus is reduced and its reliability improved.

As also described above, in accordance with the present invention it suffices to dispose an elevating plate having two sets of rollers as guide members on one side of the tray. The tray is horizontally moved by a four-point support structure constructed by the guide member of the elevating plate, the guide member of the arm plate and the guide member of the chassis. Accordingly, the tray is not inclined and twisted during the movement thereof so that the tray is stably moved.

Further, the tray is lowered by a three-point support structure constructed by the guide member of the elevating plate and the guide member of the arm plate, and the guide member of the chassis is pulled upward from an opening at one end of the guide groove on the other side of the tray, thereby smoothly lowering the tray.

Since an elevating plate is disposed on only one side of the tray and the arm plate is disposed above the tray, the lower side of the tray is left open. This space is thus available for the mounting of an electronic circuit or the like. Also, if desired the space can be used for the drive mechanism of the optical pickup and the spindle motor driving the turntable. Hence, the overall size of the apparatus can be reduced and the degree of freedom of design is improved.

As yet further described above, in accordance with the present invention, when the support plate is moved in the axial direction thereof, the cam member is moved in the same axial direction to perform tilting adjustment by inclining the support plate. Thus, the tilt angle of the support plate is changed so that a perpendicular relationship between the optical axis of the pickup and the face of the optical disk is maintained at all times.

Accordingly, the adjustment of parallelism and the tilt adjustment can be performed simply and easily using a single cam member and with the movement of the support plate. Thus, the construction of the pickup device is simplified and the number of assemblies is reduced so that the cost of the device is reduced. Also, the apparatus is easy to repair.

What is claimed is:

1. An optical disk reproducing apparatus, comprising: a tray for receiving an optical disk thereon, said tray having a pair of guide grooves extending horizontally along opposite sides of said tray, said guide groove on one side of said tray having an opening at one end extending towards an upper face of said tray; an elevating member disposed on the other side of said tray, said elevating member having first and second guide members for guiding said guide groove on said other side of said tray; an arm plate disposed on said one side of said tray, said arm plate being rotatably mounted at one end, said arm plate having a third guide member disposed at the other end thereof engaged with said guide groove on said one side of said tray such that said arm plate is rotated in association with up and down movement of said elevating member; and a stationarily mounted fourth guide member engaged with said guide groove on said one side of said tray when said tray is extended outwardly, said fourth guide member moving out of said guide groove on said one side of said tray when said tray is in an inward position and is lowered by operation of said elevating member.

2. The optical disk reproducing apparatus of claim 1, wherein each of said first through fourth guide members comprises a roller.

3. The optical disk reproducing apparatus of claim 2, wherein each of said rollers has a spherically expanded portion at an end portion thereof engaged with a respective one of said guide grooves.

4. An optical disk reproducing apparatus, comprising: a tray for receiving an optical disk thereon; a chassis; a turntable for receiving said optical disk from said tray and rotating said optical disk for reproduction, said turntable being rotatably mounted on said chassis; a rotary member having a projection and having a cam groove formed therein; a slide member having an arm portion and having an engaging groove formed therein, said projection of said rotary member being received in said engaging groove, said slide member being engaged with said tray for moving said tray in a vertical direction in response to movement of said projection of said rotary member in said engaging groove; an engaging member having a projection inserted into said cam groove of said rotary member and engaged with said arm portion of said slide member; an arm plate coupled to said slide member, said arm plate being raised and lowered in response to sliding movement of said slide member; and clamper means for clamping said optical disk to said turntable, said clamper means being coupled to an end portion of said arm plate.

5. The optical disk reproducing apparatus of claim 4, wherein said arm plate has a pin fixed thereto received in a groove in said slide member for coupling said arm plate to said slide member, and wherein further comprising means for pivotally coupling said arm plate to a chassis of said apparatus at an end portion of said arm plate opposite end portion to which said clamper is coupled.

6. The optical disk reproducing apparatus of claim 4, further comprising: a tilt cam formed on said engaging member; an optical pickup; attaching means pivotally supporting said optical pickup such that said optical pickup can be moved linearly, said attaching means having a contact piece contacting said tilt cam; and means for applying a biasing force to hold said contact piece in contact with said tilt cam.

7. The optical disk reproducing apparatus of claim 6, wherein said attaching means comprises: an attaching body to which said optical pickup is attached; a support plate; a guide shaft attached to said support plate, said attaching body being linearly guided by said guide shaft at at least two points; an auxiliary attaching plate pivotally supported by said attaching body and slidably mounted on said support plate at one pivotal point; and adjusting means disposed on one side of said pivotal point between said attaching body and said auxiliary attaching plate for adjusting a distance therebetween.

8. The optical disk reproducing apparatus of claim 7, wherein said adjusting means comprises: a pressure ring and a screw for fixing a position of said pressure ring.

9. The optical disk reproducing apparatus of claim 7, further comprising: a contact piece fixed to said chassis; a support shaft supported by said chassis, said support plate being supported by said support shaft; means for applying a biasing force to bias said support plate in one direction of said support shaft; and second adjusting means disposed on said support plate and contacting said contact piece of said chassis against said biasing force for moving and fixing said support plate in an axial direction of said support shaft.

10. The optical disk reproducing apparatus of claim 9, wherein said second adjusting means comprises a rotary plate.

11. The optical disk reproducing apparatus of claim 9, further comprising axially movable cam means for inclining said support plate with respect to an axis thereof.

12. The optical disk reproducing apparatus of claim 4, wherein said arm plate has a push-up projection formed thereon, and wherein said clamper means comprises: a clamper attaching plate pivotally supported at one end thereof and vertically rotated, said arm plate being pivotally supported in a direction perpendicular to a pivotal support portion of said clamper attaching plate; a clamper housing body supported parallel to a pivotal support portion of said clamper attaching plate at one end thereof, said push-up projection of said arm plate pushing said clamper housing body upward parallel to a pivotal support portion of said arm plate; and a clamper rotatably housed in said clamper housing body.

* * * * *